United States Patent [19]

Kurita et al.

[11] Patent Number: 5,485,529
[45] Date of Patent: Jan. 16, 1996

[54] IMAGE PROCESSING APPARATUS WITH THE ABILITY TO SUPPRESS ISOLATED POINTS

[75] Inventors: Mitsuru Kurita; Yoshinori Ikeda, both of Tokyo, Japan

[73] Assignee: Canon Kabushiki Kaisha, Tokyo, Japan

[21] Appl. No.: 245,079

[22] Filed: May 17, 1994

Related U.S. Application Data

[63] Continuation of Ser. No. 936,739, Aug. 31, 1992, abandoned, which is a continuation of Ser. No. 510,462, Apr. 17, 1990, abandoned.

[30] Foreign Application Priority Data

| Apr. 18, 1989 | [JP] | Japan | 1-97722 |
| May 10, 1989 | [JP] | Japan | 1-117014 |
| May 10, 1989 | [JP] | Japan | 1-117015 |

[51] Int. Cl.$^6$ .................................................. G06K 9/00
[52] U.S. Cl. ..................... 382/162; 358/500; 382/266
[58] Field of Search ........................ 382/9, 17, 22, 382/54, 55, 162, 164, 167, 176, 173, 199, 266, 275; 358/520, 425

[56] References Cited

U.S. PATENT DOCUMENTS

| 4,415,920 | 11/1983 | Kato et al. | 358/37 |
| 4,601,002 | 7/1986 | Rosenthal | 382/55 |
| 4,694,502 | 9/1987 | Ozawa et al. | 382/17 |
| 4,769,849 | 9/1988 | Alsing | 382/9 |
| 4,847,689 | 7/1989 | Yamamoto et al. | 358/80 |
| 4,922,332 | 5/1990 | Taniguchi et al. | 358/77 |
| 4,991,022 | 2/1991 | Canfield et al. | 358/180 |

FOREIGN PATENT DOCUMENTS 227848  7/1987  European Pat. Off. .

OTHER PUBLICATIONS

"A Realtime Image Processing Chip Set", in IEEE Int'l Solid–State Circuits Conf.–ISSCC, 20 Feb. 1986, pp. 148–149, 330–331, by Ruetz et al., 1986.

Primary Examiner—Joseph Mancuso
Attorney, Agent, or Firm—Fitzpatrick, Cella, Harper & Scinto

[57] ABSTRACT

An image processing apparatus processes an input image, detects an isolated point in the input image, and controls the image processing according to detection of the isolated point, thereby eliminating noise conventionally involved in a color conversion to red of an image contour.

9 Claims, 31 Drawing Sheets

FIG. 17

| $a_1$ | $a_2$ | $a_3$ | $S_1$ | $S_2$ | SELECTOR | |
|---|---|---|---|---|---|---|
| 0 | 0 | 0 | 0 | 0 | A | WHEN BACKGROUND |
| 1 | 0 | 1 | 0 | 1 | B | WHEN FRAME SURROUNDING CHARACTER |
| 1 | 1 | 0 | 1 | 0 | C | WHEN CHARACTER PORTION |

FIG. 18

| $d_{11}$ | $d_{12}$ | $d_{13}$ |
|---|---|---|
| $d_{21}$ | $d_{22}$ | $d_{23}$ |
| $d_{31}$ | $d_{32}$ | $d_{33}$ |

$$\begin{cases} d_{22}Y = \frac{1}{8}(d_{11}Y + d_{12}Y + d_{13}Y + d_{21}Y + d_{23}Y + d_{31}Y + d_{32}Y + d_{33}Y) \\ d_{22}M = \frac{1}{8}(d_{11}M + d_{12}M + d_{13}M + d_{21}M + d_{23}M + d_{31}M + d_{32}M + d_{33}M) \\ d_{22}C = \frac{1}{8}(d_{11}C + d_{12}C + d_{13}C + d_{21}C + d_{23}C + d_{31}C + d_{32}C + d_{33}C) \end{cases}$$

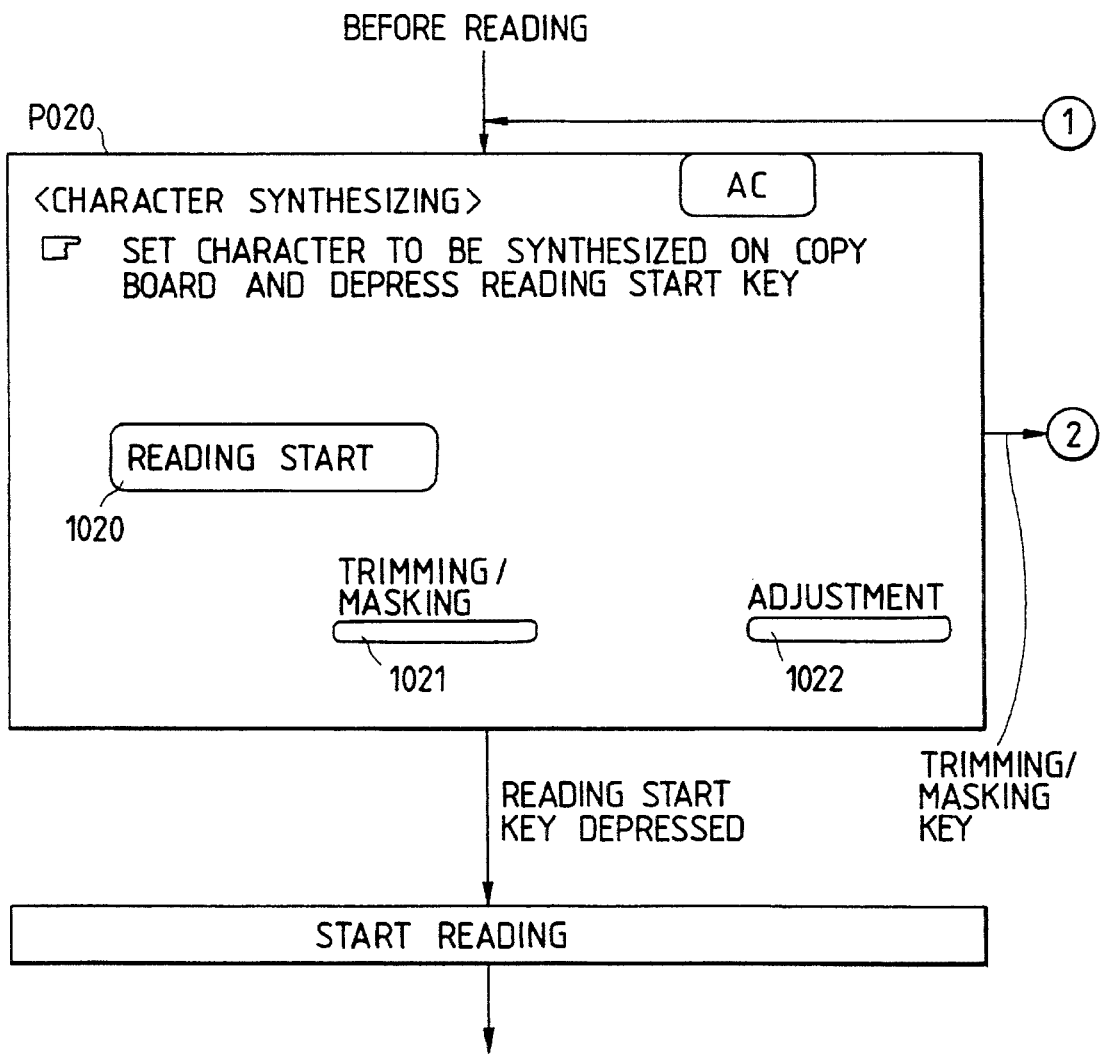

FIG. 22
| FIG. 22A | FIG. 22B | | |
|---|---|---|---|
| FIG. 22C | FIG. 22D | FIG. 22E | FIG. 22F |
FIG. 22A
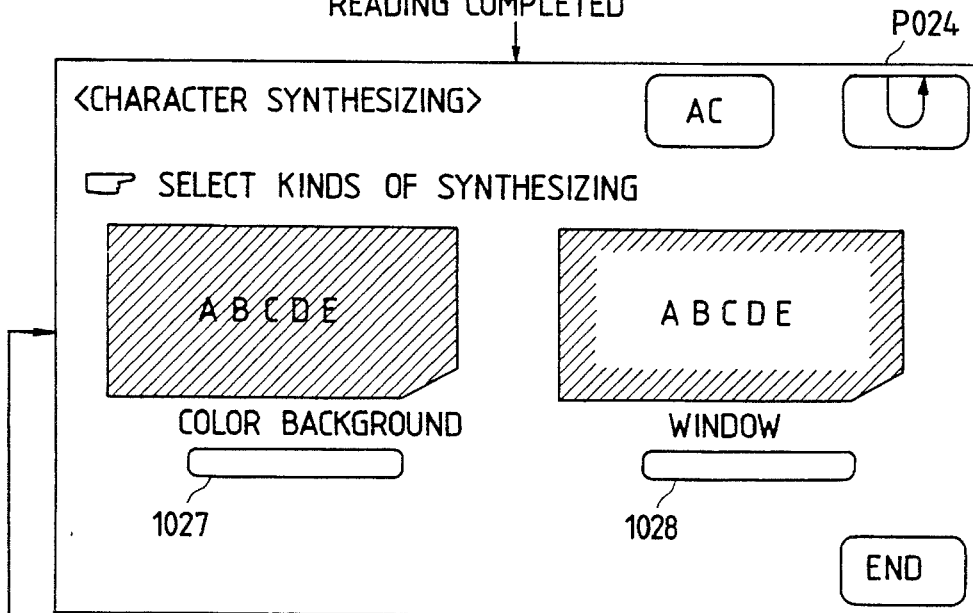
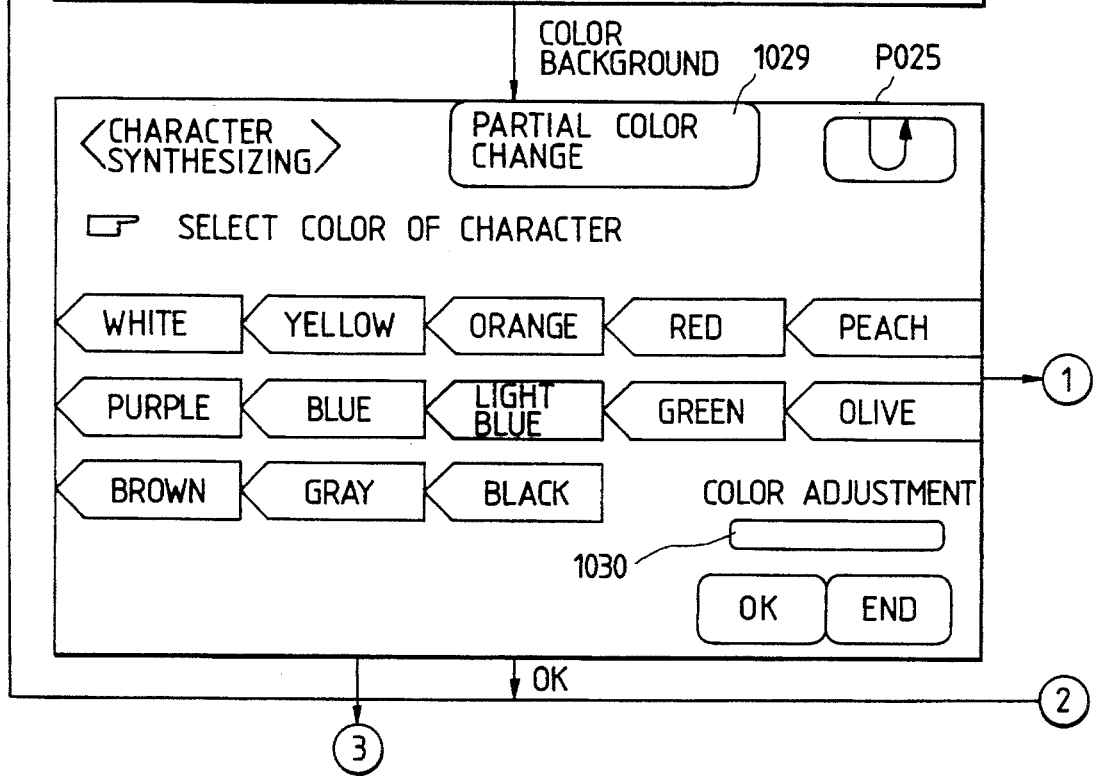

FIG. 22F

COLOR ADJUSTMENT — P033

⟨CHARACTER SYNTHESIZING⟩

☞ ADJUST COLOR

YELLOW   :   0 %   − +
MAGENTA  :   0 %   − +
CYAN     :   0 %   − +
BLACK    :   0 %   − +

OK   END

⑨

FRAME WIDTH — P041     OK

⟨CHARACTER SYNTHESIZING⟩

☞ ADJUST FRAME WIDTH

▼

←   →      OK   END

⑩

⑫

IMAGE PROCESSING APPARATUS WITH THE ABILITY TO SUPPRESS ISOLATED POINTS

This application is a continuation of application Ser. No. 07/936,739, filed Aug. 31, 1992, now abandoned, which was a continuation of application Ser. No. 07/510,462, filed Apr. 17, 1990, now abandoned.

BACKGROUND OF THE INVENTION

1. Field of the Invention

The present invention relates to an apparatus for image processing, and more particularly to such an apparatus adapted for processing a color image.

2. Related Background Art

U.S. patent application Ser. No. 363,590, assigned to the assignee of the present invention, discloses an image processing apparatus capable of color conversion of an image contour, for example from a state shown in FIG. 7A to another state shown in FIG. 7B.

However, the above-mentioned apparatus is associated with a drawback that, for example in a color conversion to red of an image contour involving noise such as ns1, ns2, . . . as shown in FIG. 8A, the contour of such noise is also converted into red as shown in FIG. 8B whereby such noise becomes overly conspicuous.

SUMMARY OF THE INVENTION

An object of the present invention is to provide an image processing apparatus capable of satisfactory image processing, eliminating the influence of such noise.

The above-mentioned object can be attained, according to the present invention, by an image processing apparatus comprising means for processing an input image; means for detecting an isolated point in said input image; and means for controlling the image processing by said processing means according to the detection of the isolated point by said detection means.

Another object of the present invention is to provide an image processing apparatus capable of satisfactory processing of contoured characters.

The above-mentioned object can be attained, according to the present invention, by an image processing apparatus comprising extraction means for extracting the contour of input image data; process means for coloring, with a predetermined width, the contour extracted by said extraction means; and control means for prohibiting the coloring by said process means to the isolated point in said input image data.

Still another object of the present invention is to provide an image processing apparatus capable of appropriate binarizing process.

The above-mentioned object can be attained, according to the present invention, by an image processing apparatus comprising means for binary digitizing input image data; means for controlling said binary digitizing process on the isolated point in said input image; and means for forming contoured characters from said input image, based on the output of said binary digitizing means.

Still another object of the present invention is to provide an image processing apparatus capable of providing a satisfactory image free from noise.

The above-mentioned object can be attained, according to the present invention, by an image processing apparatus comprising means for eliminating isolated points from the input image data; and means for forming contoured characters from the image data from which the isolated points are eliminated by said eliminating means.

Still another object of the present invention is to provide an image processing apparatus capable of various processings.

The above-mentioned object can be attained, according to the present invention, by an image processing apparatus comprising contour extraction means for extracting the contours of an image; converted color designation means for designating a converted color for the contour; color conversion means for effecting color conversion, on said extracted contours, to said converted color designated by said converted color designation means; and means for varying the width of said contours.

Still other objects are structures of the present invention will become apparent from the following description to be taken in conjunction with the attached drawings.

BRIEF DESCRIPTION OF THE DRAWINGS

FIG. 17 is a chart showing truth values of a selector 105;

FIG. 18 is a view showing the principle of background filling of the present invention;

DESCRIPTION OF THE PREFERRED EMBODIMENTS

Now the image processing apparatus of the present invention will be clarified in detail by the preferred embodiments, shown in the attached drawings.

Embodiment 1

Figure 1A:
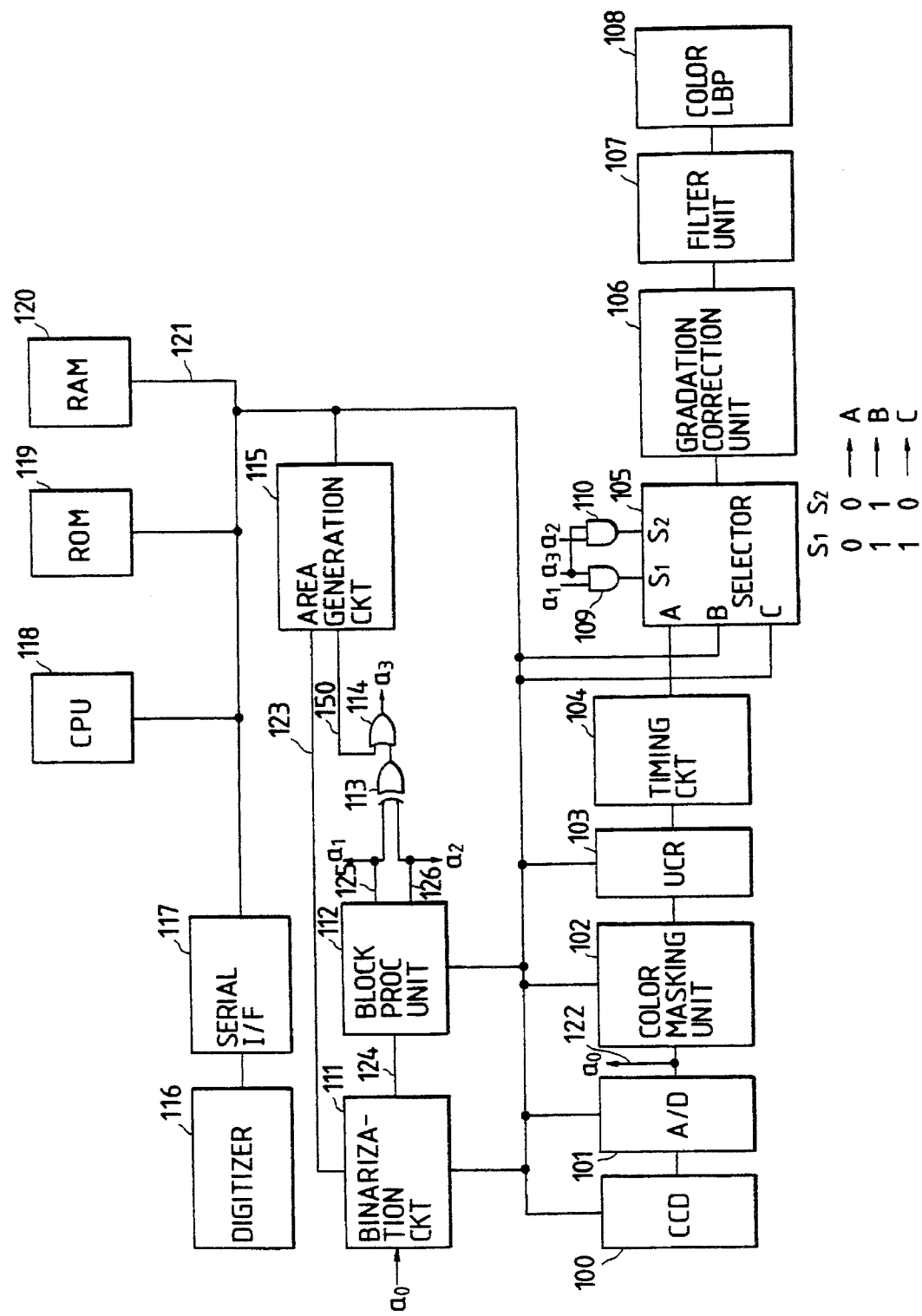
FIGS. 1A and 1B are respectively a block diagram and an explanatory view of an image processing apparatus constituting a first embodiment of the present invention.

FIG. 1A is a block diagram of an entire image processing apparatus (copying machine) constituting a first embodiment of the present invention.

In FIG. 1A, there are shown a CCD 100 for reading the image in each of several color components, e.g., red, green and blue; an A/D converter 101 for converting the analog signal into a digital signal; a color masking unit 102 for color correction; a UCR unit 103 for undercolor removal; a timing circuit 104; a selector 105 functioning on the signal obtained by a block process unit 112; a gradation correction unit 106 for correcting the gradation according for example to the characteristics of printer; a filter unit 107 for smoothing or edge enhancement of the image data; a full-color laser beam printer (LBP) 108 for printing an image with toners of yellow, magenta, cyan and black colors; AND gates 109, 110; a binary digitizing circuit 111 for obtaining binary signals from A/D converted data; a block processing unit 112; an exclusive OR gate 113; an OR gate 114; an area generation circuit 115 for generating plural area signals and enable signals; a digitizer 116 for area designation from outside the apparatus; a serial interface 117; a CPU 118 connected to a CPU bus 121; a ROM 119 storing programs etc.; and a RAM 120 serving as auxiliary memory.

Figure 1B:
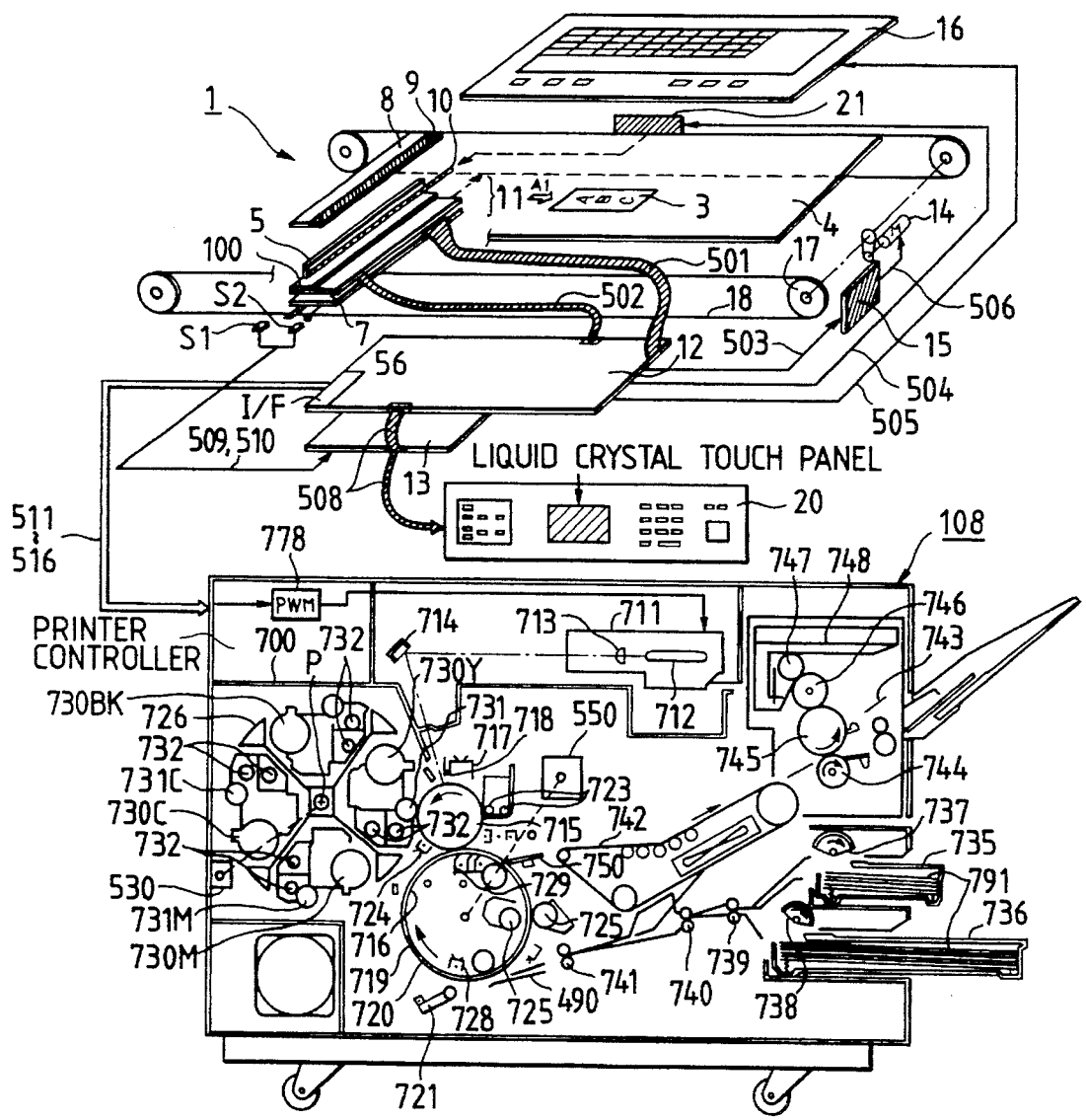

FIG. 1B shows an example of the internal structure of the digital color image processing system of the present embodiment, consisting of a digital color image reading unit 1 (hereinafter called color reader) in the upper part, and a digital color image printing unit 108 (hereinafter called color printer) in the lower part. Said color reader 1 reads the original color image information in respective colors separated by color separating means and a photoelectric converting device such as CCD 100, and converts said information into an electric digital image signal. The color printer 108 is an electrophotographic laser beam color printer for reproducing the color image by respective colors according to said digital image signal and transferring said image in digital dots plural times to a recording sheet.

At first there will be explained the outline of the color reader 1.

There are shown an original 3; a platen glass 4 for supporting said original; and a rod lens array 5 concentrating light, reflected from the original illuminated by a halogen lamp 10, onto a same-size full-color image sensor 100. The components 5, 6, 7 and 10 are integrated as a scanning unit 11 for effecting the scanning motion in direction A1. The color-separated image signal, obtained for each line by said scanning motion, is amplified to a predetermined voltage level by an amplifying circuit 7, and is supplied through a signal line 501 to a video processing unit for signal processing, as will be explained later. A concentric cable is used as line 501 for ensuring faithful signal transmission. A signal line 502 is used for supplying the driving pulses for the full-color image sensor 100, generated in the video processing unit 12. White and black plates 8, 9 are used for generating predetermined signal levels when illuminated by the halogen lamp 10, for correcting the white and black levels of the video signal. A control unit 13 incorporating a microcomputer executes all the control operations of the color reader 1, including the display and key input of a control panel 3150 through a bus 508, control of the video processing unit 12, detection of the scanning unit 11 by position sensors S1, S2 through signal lines 509, 510, control of a stepping motor driving circuit for a stepping motor 14 used for driving the scanning unit 11 through a signal line 503, on/off and intensity control of the halogen lamp 10 through a lamp driver and a signal line 504, and control of digitizer 116, internal keys and display unit through a signal line 505. The color image signal read by the scanning unit 11 in the original scanning operation is supplied, through the amplifying circuit 7 and the signal line 501, to the video processing unit 12 for various processes to be explained later, and is further supplied to the printer unit 108 through an interface circuit 56.

In the following there will be briefly explained the structure of the color printer 108. A scanner 711 is provided with a laser unit for converting the image signal from the color reader 1 into an optical signal, a polygonal mirror 712 (for example octagonal), a motor (not shown) for rotating said mirror 712, and an f-θ (imaging) lens 713. There are further shown a mirror 714 for deflecting the laser beam, and a photosensitive drum 715. The laser beam emitted from the laser unit is reflected by the polygonal mirror 712, then is guided by the lens 713 and the mirror 714, and performs raster scanning on the surface of the photosensitive drum 715, thereby forming a latent image corresponding to the original image.

Around the photosensitive drum 715 there are provided a primary charger 711, a flush exposure lamp 718, a cleaner unit 723 for recovering the toner remaining in the image transfer, and a pre-transfer charger 724.

A developing unit 726 for developing the electrostatic latent image formed on the photosensitive drum 715 by the laser beam, is provided with developing sleeves 731Y, 731M, 731C, 731Bk for effecting the image development in direct contact with the photosensitive drum 715, toner hoppers 730Y, 730M, 730C, 730Bk for holding toners, and screws 732 for transferring the toners. These members are mounted for rotation about a rotary shaft P of the developing unit. For example, for forming a yellow toner image, the image development is conducted in the illustrated position with yellow toner. For forming a magenta toner image, the developing unit 726 is rotated about the shaft P until the developing sleeve 731M of the magenta developing unit comes into contact with the photosensitive drum 715. The image development with cyan or black toner is conducted also in a similar manner.

A transfer drum 716 is provided for transferring the toner image, formed on the photosensitive drum 715, onto a sheet. Around said transfer drum 176, there are provided an actuator plate 719 for detecting the position of the transfer drum 761, a position sensor 720 for detecting the movement of the transfer drum 716 to a home position upon reaching proximity of said actuator plate 719, a cleaner 725 for the transfer drum, a sheet holding roller 727, a charge eliminator 728 and a transfer charger 729.

There are also provided sheet cassettes 735, 736 containing recording sheets; sheet feeding rollers 737, 738 for feeding sheets from said cassettes 735, 736; and timing rollers 739, 740, 741 for adjusting the timing of sheet feeding and transportation. The sheet transported by these components is guided by a sheet guide 749, and, with the leading end being gripped by a gripper to be explained later, is wound around the transfer drum 716, thus entering an image forming process.

There are further provided a drum rotating motor 550 for rotating the photosensitive drum 715 and the transfer drum 716 in synchronization; a separating finger 750 for separating the sheet from the transfer drum 716 after the completion of the image forming process; a conveyor belt 742 for transporting the separated sheet; and an image fixing unit 743 for fixing the image of the sheet transported by the conveyor belt 742, including a pair of heated pressure rollers 744, 745.

Figure 2:
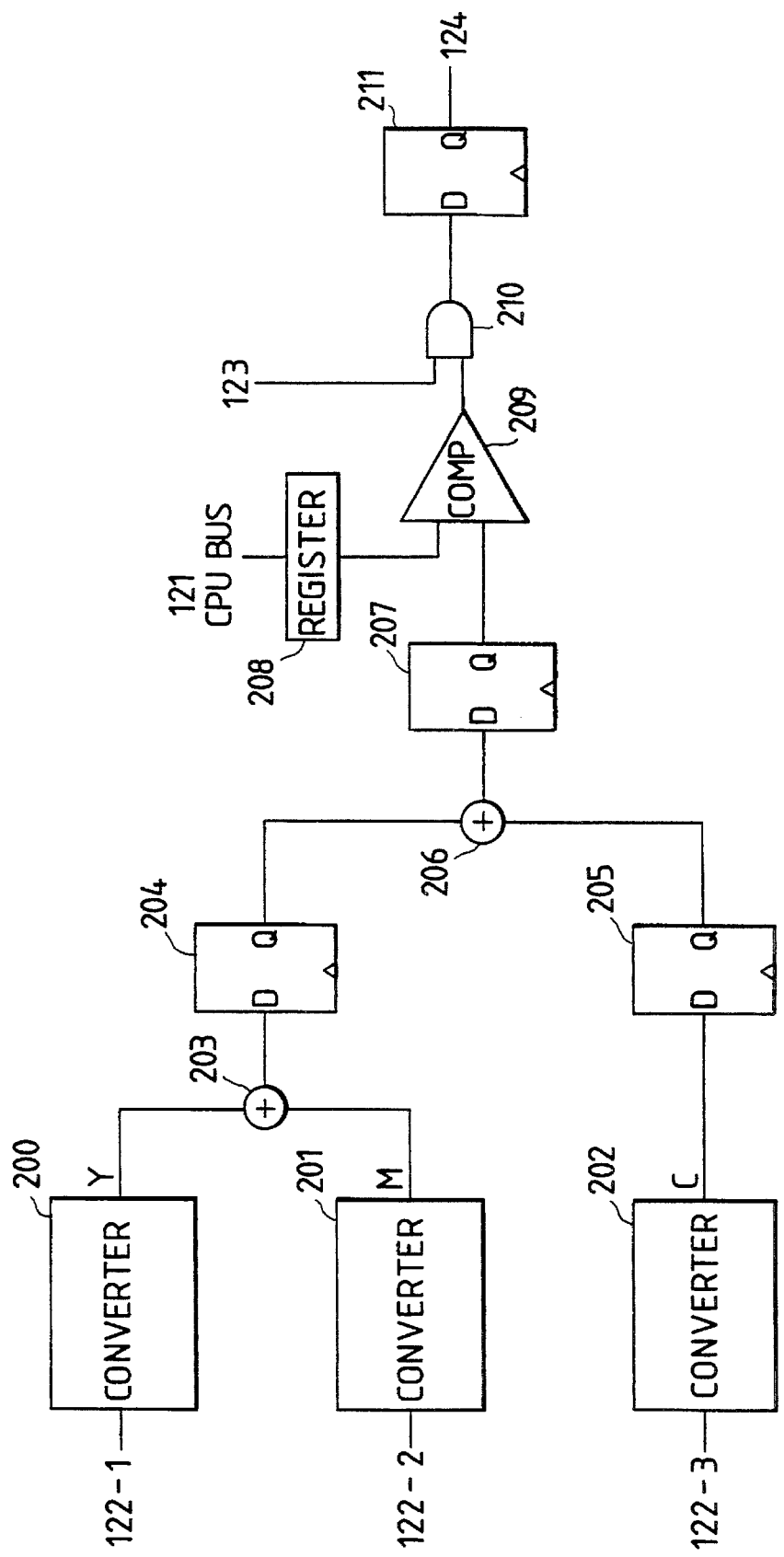
FIG. 2 is a circuit diagram of a conventional binary digitizing circuit.

FIG. 2 shows a conventional example of the binary digitizing circuit 111 mentioned above.

In FIG. 2, there are shown color component data 122-1–122-3 of R, G and B colors after A/D conversion; converters 200–202 for conversion into data of yellow (Y), magenta (M) and cyan (C) colors; adders 203, 206; D-flip-flops 204, 205, 207, 211 for timing adjustment; a register 208; a comparator 209; and an AND gate 210.

In the above-explained circuit, the signals 122-1–122-3 are respectively converted into Y, M and C signals. Then a signal representing the sum Y+M+C is produced by the adders 203, 206, and is compared, by the comparator 209, with the data set in the register 208 by the CPU 118 through the CPU bus 121. The AND gate 210 functions as an enable gate, releasing a binary digitized signal according to an enable signal 123 from the area generation circuit 115. Said binary digitizing circuit 111 generates an area signal which is "1" at the position of a character as shown in FIG. 6C.

Figure 3:
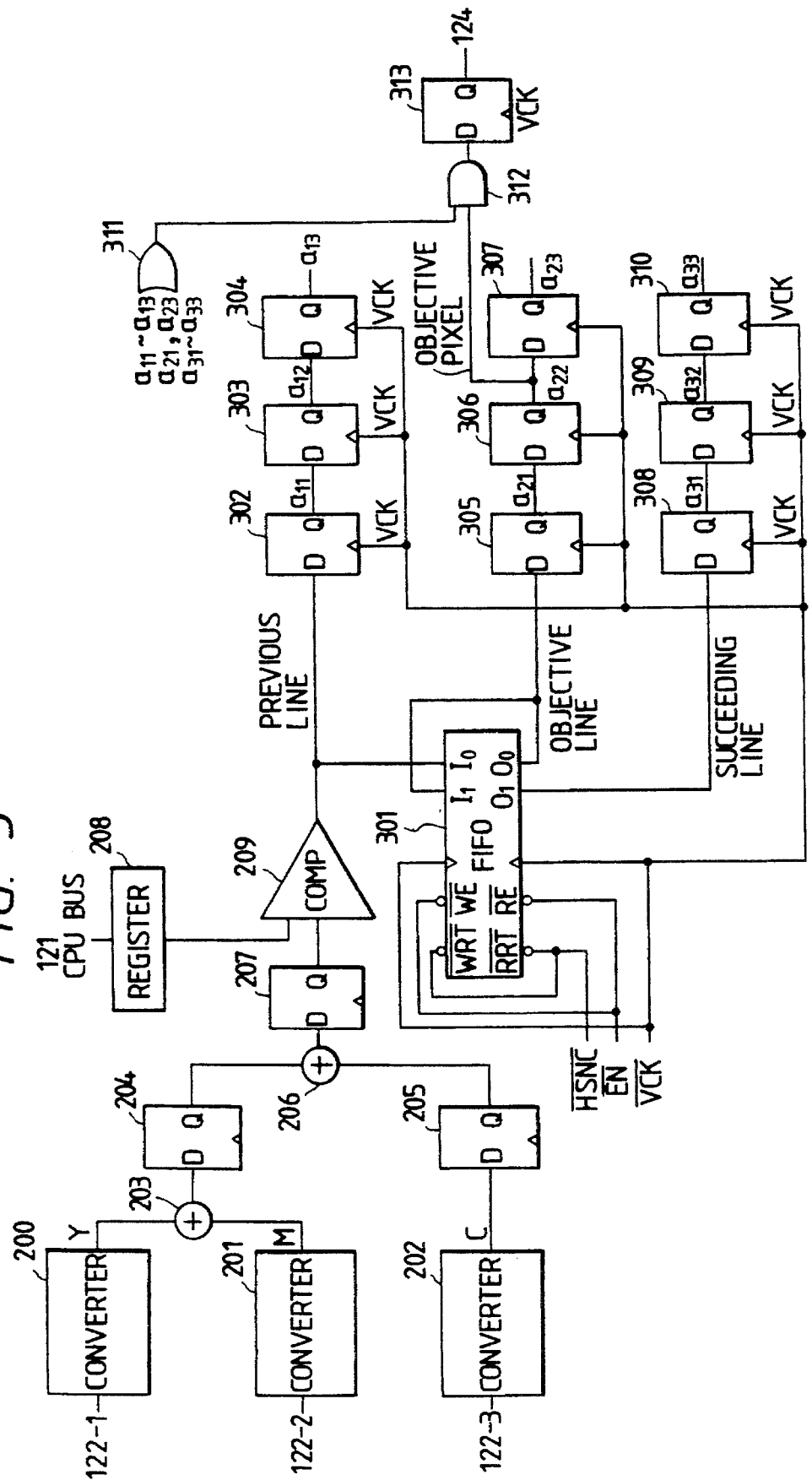
FIG. 3 is a circuit diagram of a binary digitizing circuit in the first embodiment of the present invention.

On the other hand, FIG. 3 shows the binary digitizing circuit 111 employed in the present invention. Said circuit is capable of noise elimination by a block processing.

In FIG. 3, the components 200–209, 122-1– 122-3 are the same as those in FIG. 2.

There are further provided a first-in-first-out (FIFO) register 301 for a one-line delay; D-flip-flops 302–310, 313 for timing control; an OR gate 311; and an AND gate 312.

In the above-explained structure, the circuit down to the comparator 209 generates the binary digitized signal by a process the same as in the circuit shown in FIG. 2. The present circuit is characterized by the ensuing processing. As shown in FIG. 6B, there is considered a 3×3 pixel block around and including the pixel to be contemplated (herein sometimes called the "objective pixel"), and, if 8 pixels $a_{13}$, $a_{12}$, $a_{11}$, $a_{23}$, $a_{21}$, $a_{33}$, $a_{32}$, $a_{31}$ adjacent to the contemplated pixel are all 0, said pixel is digitized as 0 regardless of whether the data $a_{22}$ thereof is 1 or 0. In this manner an isolated point in the image is detected, and is excluded from the block processing (contoured character processing).

Figure 8A:
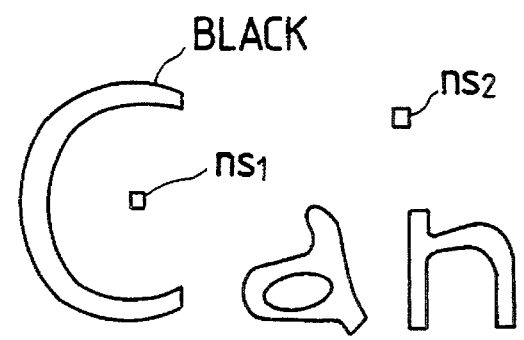
Figure 8B:
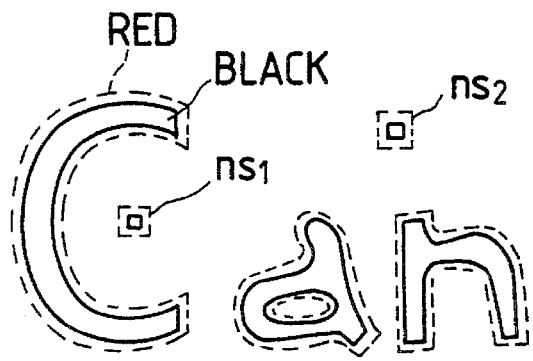
Figure 8C:
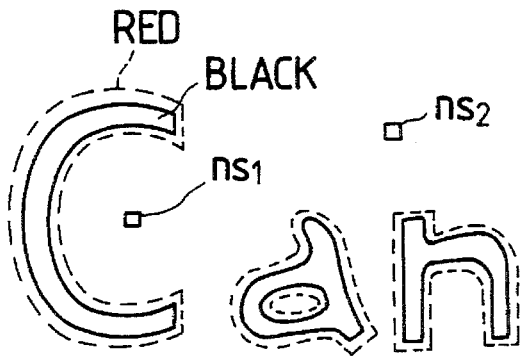
Figure 9A:
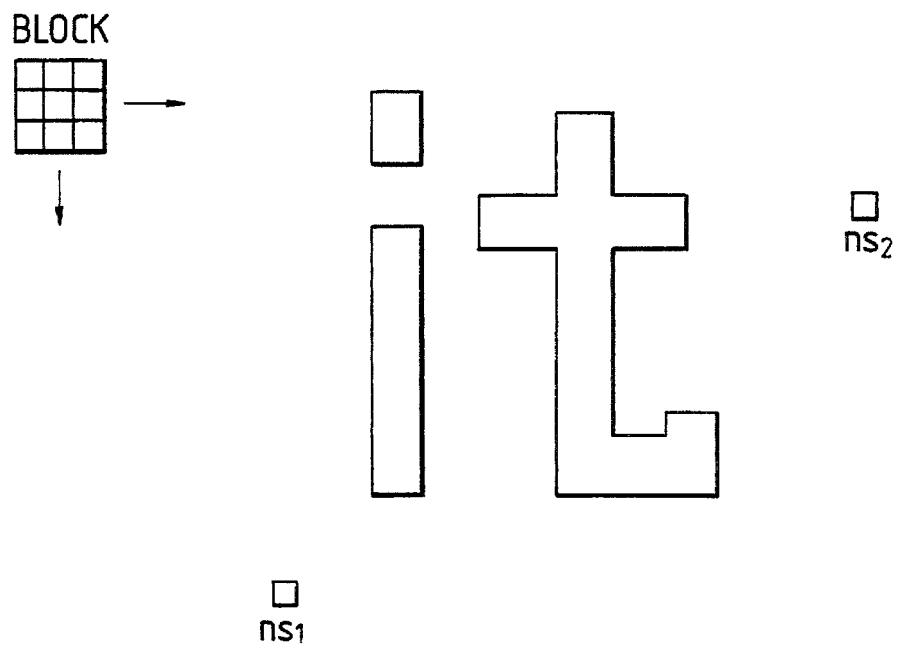
FIGS. 9A and 9B are views showing illustrating operation of the first embodiment of the present invention.

Such processing eliminates the noises ns1, ns2, . . . in the original image as shown in FIGS. 8A 9A, thus providing a noise-free digitized signal. Consequently, in the ensuing contoured character processing, there can be prevented deterioration of the image resulting from contouring on such noise.

The above-explained circuit functions in the following manner. The binary data obtained from the comparator 209 are supplied to the FIFO register 301 and the D-flip-flop 302. In response to a horizontal synchronization signal $\overline{HSNC}$, an enable signal $\overline{EN}$ and a vertical synchronization signal $\overline{VCK}$, the FIFO register 301 supplies the D-flip-flop 305 with binary data after the delay of one line (data of the contemplated line, or "objective line"), and the D-flip-flop 308 with binary data after a delay of two lines.

There can be extracted three pixels $a_{11}$, $a_{12}$, $a_{13}$ of the preceding line by the D-flip-flops (DF/F's) 302, 303, 304, three pixels $a_{21}$, $a_{22}$, $a_{23}$ of the contemplated line by the DF/F's 305, 306, 307, and three pixels $a_{31}$, $a_{32}$, $a_{33}$ of the succeeding line by the DF/F's 308, 309, 310. Among these data of a 3×3 pixel block, the data of eight pixels excluding the contemplated pixel are supplied to the OR gate 311, which supplies the AND gate 132 with a signal "1" if at least one of said eight pixels is not "0", or with a signal "0" if all of said eight pixels are "0". Consequently, if all the eight pixels are "0", a signal "0" is supplied to the DF/F 313 regardless of the value of the contemplated pixel.

Figure 4:
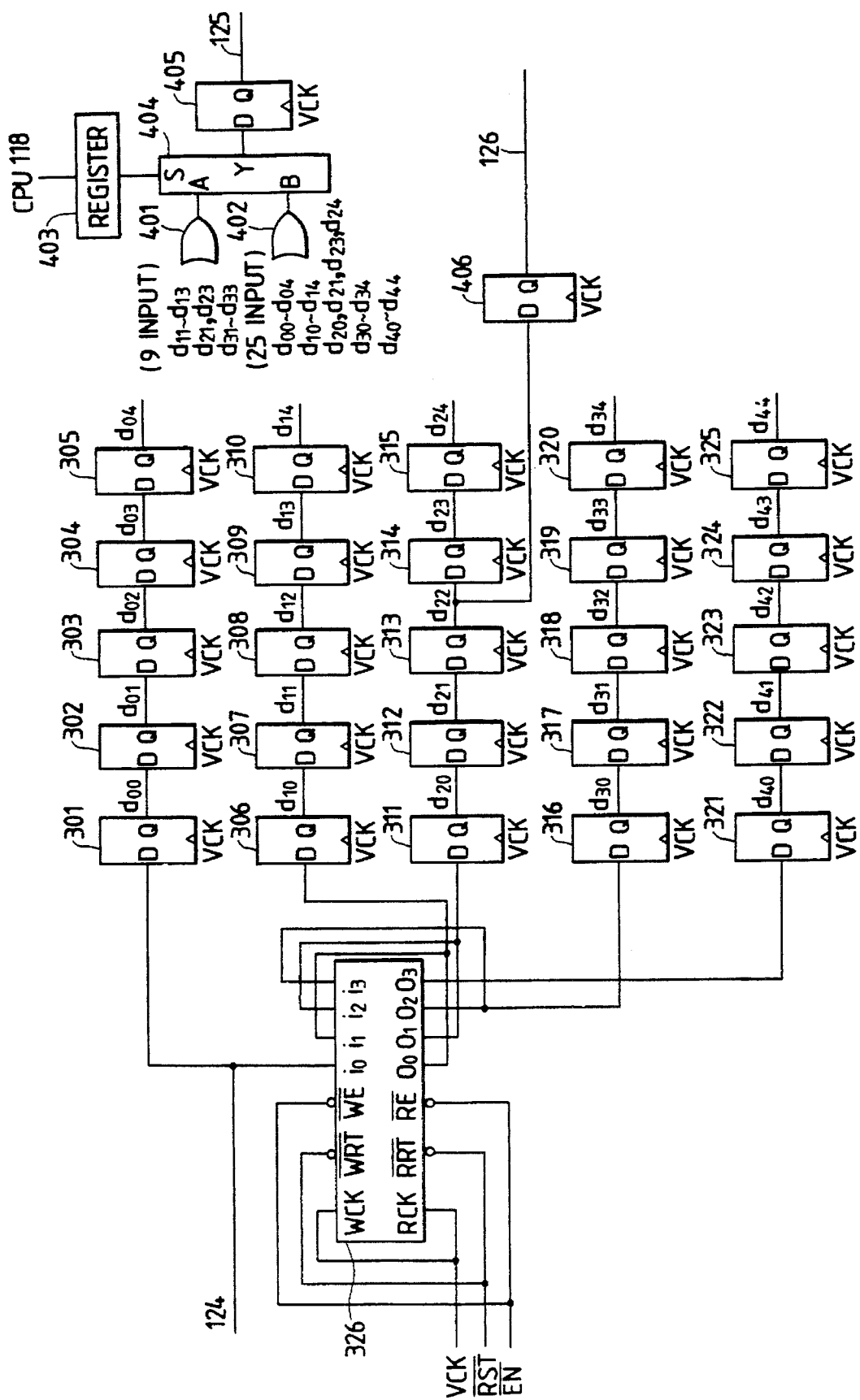
FIG. 4 is a circuit diagram of a block processing unit.

FIG. 4 shows the structure of the block processing unit 112.

In FIG. 4 there are provided DF/F's 301–325 for timing control arranged in a 5×5 matrix; a FIFO register 326 for providing a delay of one line; OR gates 401, 402; a register 403; a selector 404; and DF/F's 405, 406 for timing control.

A binary signal 124 obtained from the binary digitizing circuit 111 is supplied at first to the FIFO register 326 and the DF/F 301, and the binary data of the 5×5 pixel block are extracted in the block processing unit in a similar manner as in the circuit shown in FIG. 3.

Among these binary data, the data of the 3× 3 pixels immediately around and including $d_{22}$ are supplied to the OR gate 401, and those of 5×5 pixels around $d_{22}$ are supplied to the OR gate 402. The OR gate 401 releases a signal "1" when at least one of 9 input pixels is "1", while the OR gate 402 releases a signal "1" when at least one of 25 input pixels is "1". The register 403 memorizes the command from the CPU 118 and switches the selector 404 either to a side A or to a sides B. Since the side A and B respectively select the 3×3 matrix or the 5×5 matrix, the side B provides a thicker contoured character. Thus a discrimination signal 125 is obtained through the DF/F 405 for timing control.

The 3×3 matrix or 5×5 matrix is selected by the CPU 118 through the selector 404, and the operator can arbitrarily select a thin-contoured character or a thick-contoured character.

The signal of the contemplated pixel $d_{22}$ is obtained as through (i.e., unchanged) data 126, through the DF/F 406 for timing control.

Figure 5:
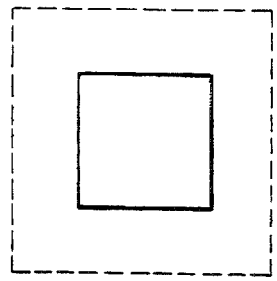
FIG. 5 is a view showing the result of block processing.

FIG. 5 illustrates the block processing, indicating that 3×3 block processing on an image indicated by a solid line provides what is shown by the broken-lined image. More specifically, said processing corresponds to the formation, from binary signals as shown in FIG. 7C, of an area signal representing a thicker character as shown in FIG. 7D.

Now reference is made again to FIG. 1, for explaining the flow of the contoured character process.

Figure 6A:
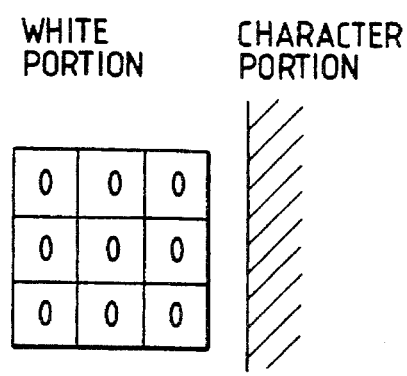
FIGS. 6A to 6C, 7A to 7D and 8A to 8C are views illustrating processes for forming contoured characters.
Figure 6B:
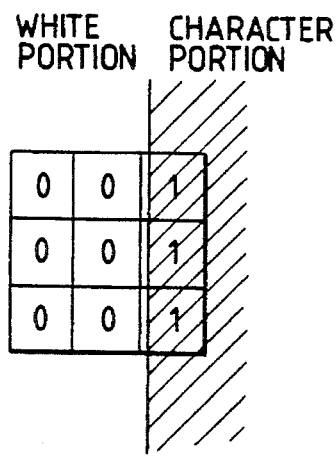
Figure 6C:
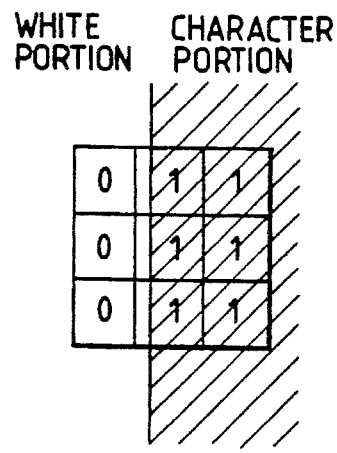

FIGS. 6A to 6C illustrate the binary data 124 in the 3×3 block, corresponding to an edge portion of a character. Now let us consider a case in which the 3×3 matrix is selected in the block processing unit 112. At first, FIG. 6A shows a case in which the 3×3 matrix is positioned outside the character, whereby the output signals 125, 126 of the block processing unit 112 are both "0", so that $a_1=a_2=0$. Also if the area signal 150 is "0", the input signals to the gate 114 are both "0", so that $a_3=0$. Because $a_1=a_2=a_3=0$, the outputs of the AND gates 109, 110 (the input signals $S_1$, $S_2$ received by the selector 105) are "0".

Said selector 105 selects a terminal A, B or C respectively in the cases where $S_1=S_2=0$, where $S_1=S_2=1$, or where $S_1=1$ and $S_2=0$.

In the state shown in FIG. 6A, the above-mentioned selector 105 selects the terminal A, whereby the image data released from the under-color removal unit 103 are directly supplied to the gradation correction unit 106.

In the state shown in FIG. 6B, the contemplated pixel is positioned in the white area but some of the surrounding pixels are in a character. In such state the through data 126 of the block processing unit 112 is "0" so that $a_2=0$. Also the OR output of the 3×3 block is "1", so that the area signal or $a_1$1. Also the exclusive OR circuit 113 provides an output signal "1". Also $a_3$=1 if the area signal 150 from the area generation circuit is "0". Since $a_1$=$a_3$=1 and $a_2$=0, there are obtained $S_1$=1 and $S_2$=0, whereby the selector 105 selects the terminal C. Thus output signals corresponding to the hatched area shown in FIG. 7B are obtained by the setting of red data by the CPU 118 in an unrepresented register of the selector C.

Then, in the case of FIG. 6C in which the contemplated pixel and some of the surrounding pixels belong to a character is, there are obtained $a_1$=$a_2$=0. Thus the exclusive OR gate 113 provides an output signal "0", and if the area signal 150 is made "0", there is obtained $a_3$=0. Thus $S_1$=$S_2$=0, so that the selector 105 selects the terminal A. Consequently the original data are sent to the gradation correction unit 106.

Figure 7A:
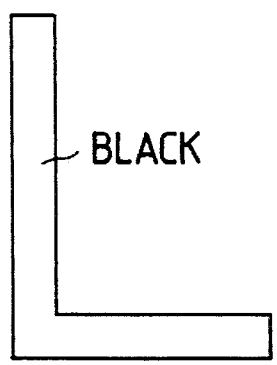
Figure 7B:
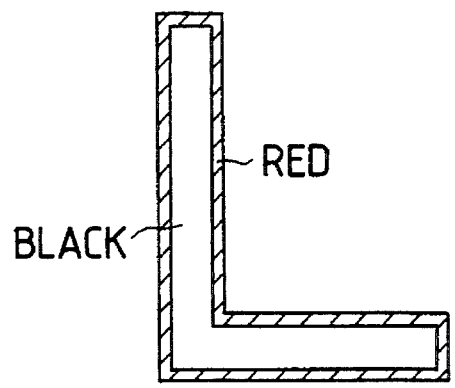
Figure 7C:
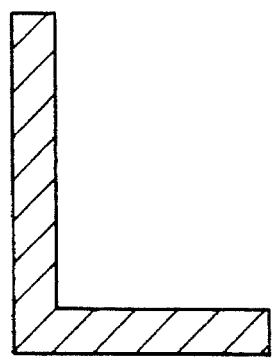
Figure 7D:
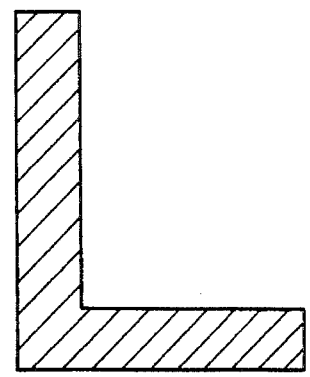

Thus there can be obtain an image as shown in FIG. 7B.

If the same process is conducted with the area signal 150 at "1", the selector 105 selects B in the character area and C in the edge area (hatched area in FIG. 7B) of the character, so that the color can be arbitrarily selected by the CPU 118 both in the character area and the edge area.

Although not shown in FIG. 1, it is also possible to apply different contoured character processings to plural areas, by providing the terminals B, C of the selector 105 with plural registers and switching said registers according to plural area signals generated by the area generating circuit 115.

As explained in the foregoing, the present embodiment is capable of prohibiting the contoured character processing on noise in the image, in the case where such noises are detected.

The present embodiment employs 3×3 and 5×5 matrices as the block pixel areas, but there may be arbitrarily employed larger or smaller matrices. Also there may be employed an arbitrary number of matrices, instead of two matrices as in the present embodiment. Furthermore, it is also possible to render the size of the matrix freely variable. The thickness of the contoured character can be arbitrarily changed by these factors.

Furthermore, in the present embodiment the contemplated pixel is digitized as "0" in the case where all the surrounding pixels are "0", but it is also possible to identify noise by counting the number of "0" pixels in the surrounding pixels and considering noise to be present if said number exceeds a certain threshold value. An appropriate noise detection can be achieved by suitable selection of said threshold value.

In the present embodiment, a contoured character is obtained by coloring the edge of the character, but it is also possible to form a pattern such as hatching or dots in the edge portion, or to form a colored pattern.

Furthermore, instead of a single contour in the present embodiment, there may be employed double or triple contours. In such case there may be employed arbitrary combinations of colors and/or patterns.

Embodiment 2

Figure 10:
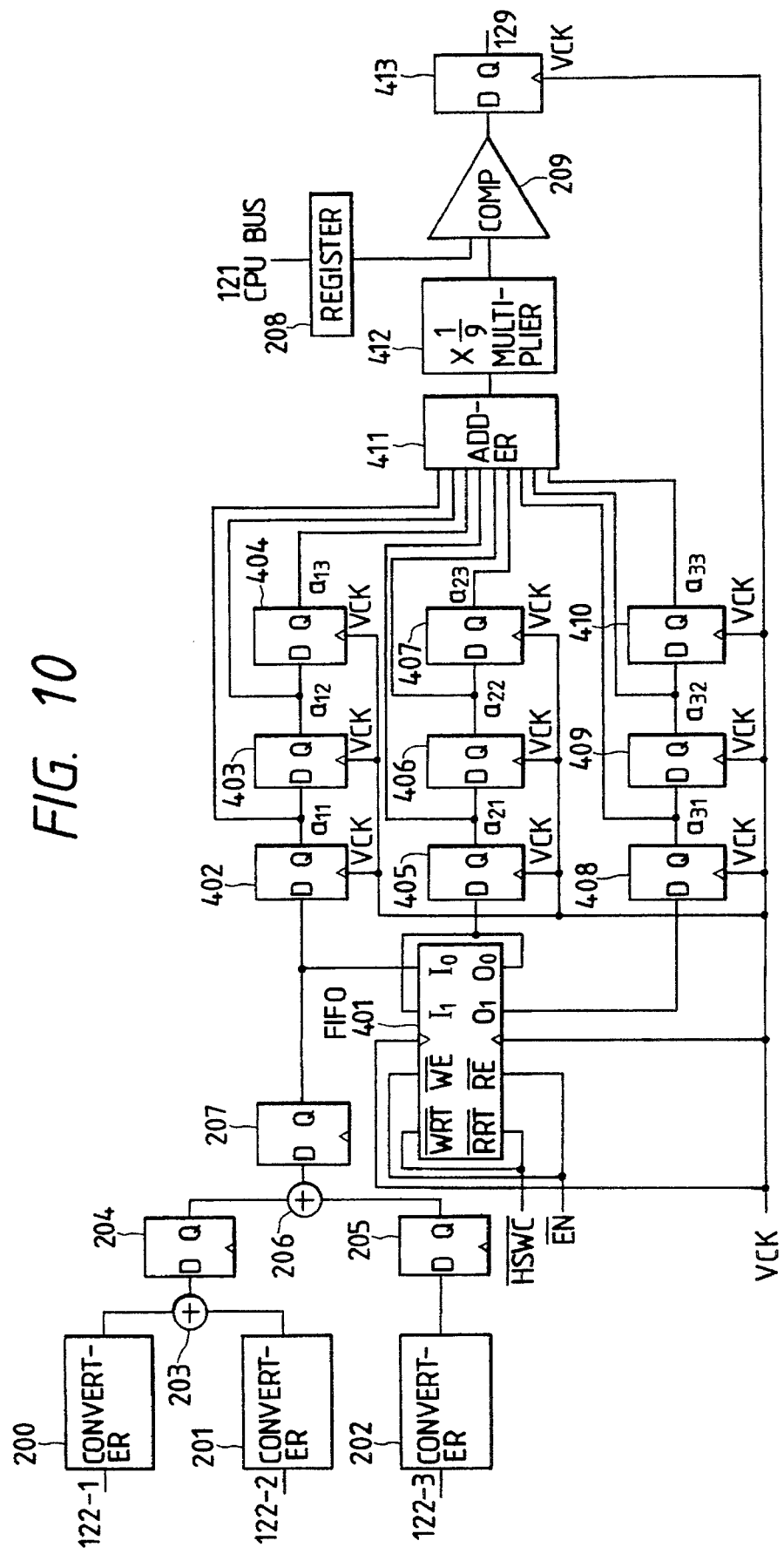
FIG. 10 is a block diagram of a second embodiment of the present invention.

Now reference is made to a block diagram shown in FIG. 10, for explaining a second embodiment of the present invention, which is featured by the block processing prior to the binary digitizing. The circuit shown in FIG. 10 is different from that shown in FIG. 3, in that an adder 411 and a ⅑ multiplier 412 are placed after the block processing and in front of the comparator 209 for binary digitizing. More specifically, the average value within a (3×3) block is obtained by adding the nine data $a_{11}$–$a_{33}$, and multiplying the sum by ⅑.

According to this algorithm, the density of the isolated (ns1, ns2) as shown in FIGS. 8A or 9A is considerably reduced, to a level below the value set in the register 208. Consequently the noise is eliminated, and the contoured character process can be applied only to the desired characters.

The present embodiment allows one, in the presence of noise, to eliminate such noises at the digitizing, thereby preventing the contoured character processing from being performed on such noise.

The present embodiment is capable of precise noise elimination, since the correlation within the block is taken into consideration at the binary digitizing, as the binary digitizing is conducted utilizing the average value within the block.

Embodiment 3

Figure 11:
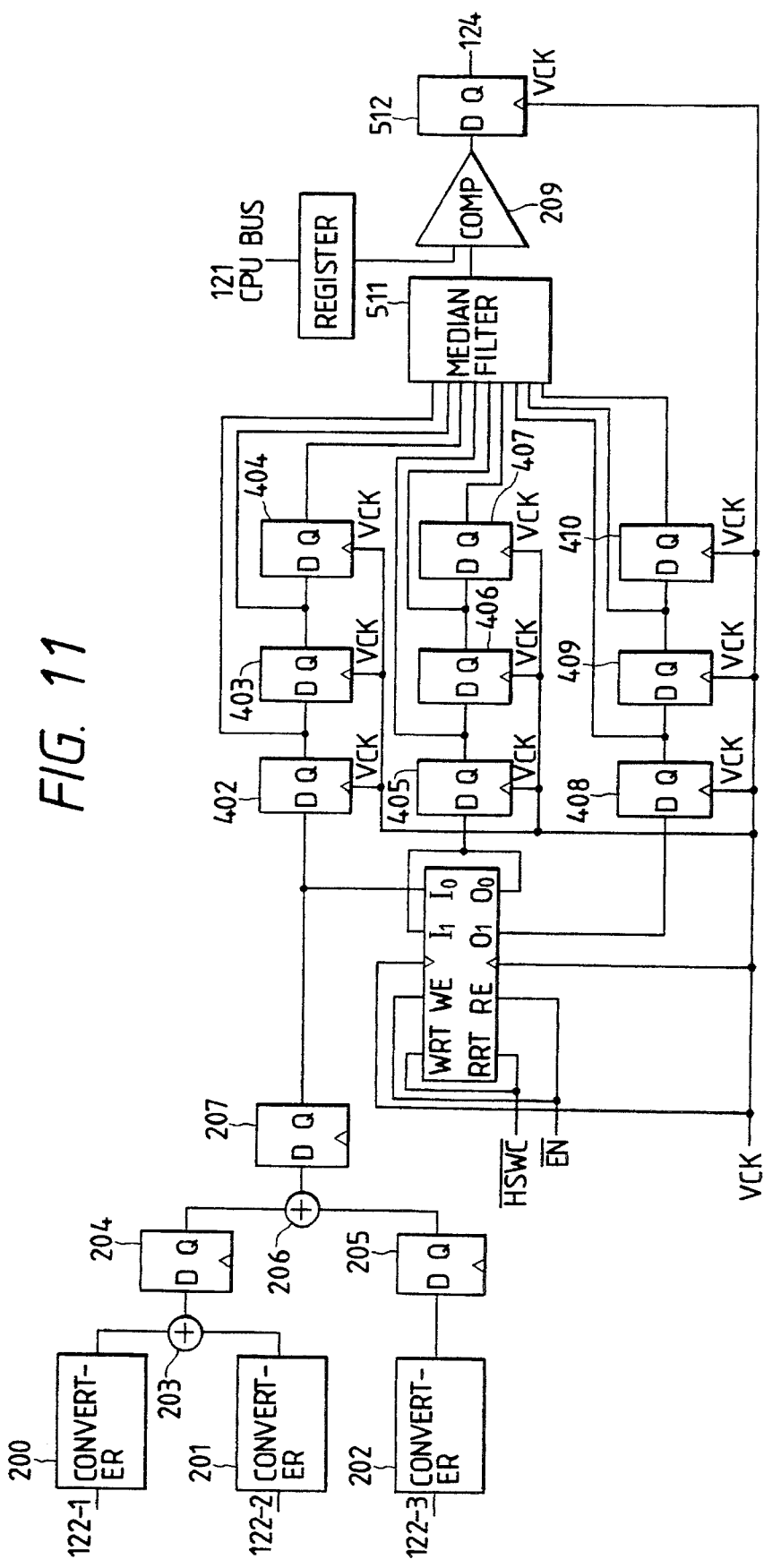
FIG. 11 is a block diagram of a third embodiment of the present invention.

FIG. 11 is a block diagram of a third embodiment of the present invention, in which the block processing is conducted prior to the binary digitizing. The present embodiment is featured by the use of a center value obtained by a median filter, instead of the average value as in the second embodiment.

Figures 12A, 12B:
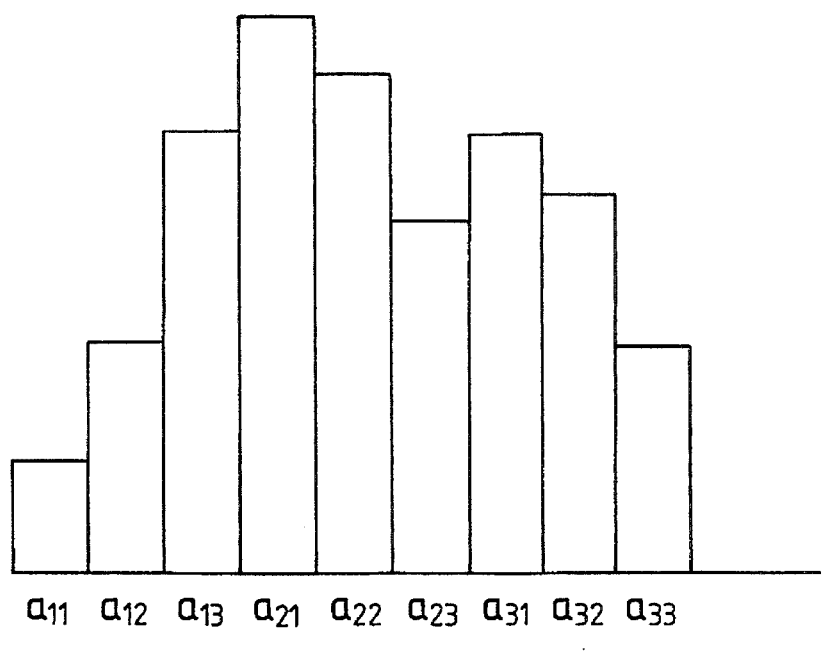
FIGS. 12A and 12B are views illustrating a median filter.

A median filter selects, for example in a 3×3 block as shown in FIG. 12A with density distribution as shown in FIG. 12B, the center value counted in descending order of density, namely the value of $a_{32}$, in the illustrated example as the value of the contemplated pixel $a_{22}$.

The difference from the embodiment shown in FIG. 10 lies in the fact that the binary digitizing is based on the center (median) value, obtained by a 3×3 median filter 511, as the data of the contemplated pixel.

In this method, the density of the isolated points as shown in FIGS. 8A or 9A becomes almost zero. Consequently the noise is eliminated and the contoured character process can be applied only to the desired characters.

As explained in the foregoing, it is possible to eliminate dust on the platen glass or noise of the original image, up to a certain size, and to reproduce a high-quality image, by effecting a block processing prior to or after the binary digitizing.

Consequently image processing of higher precision can be achieved with a compact circuitry.

Embodiment 4

Figure 13:
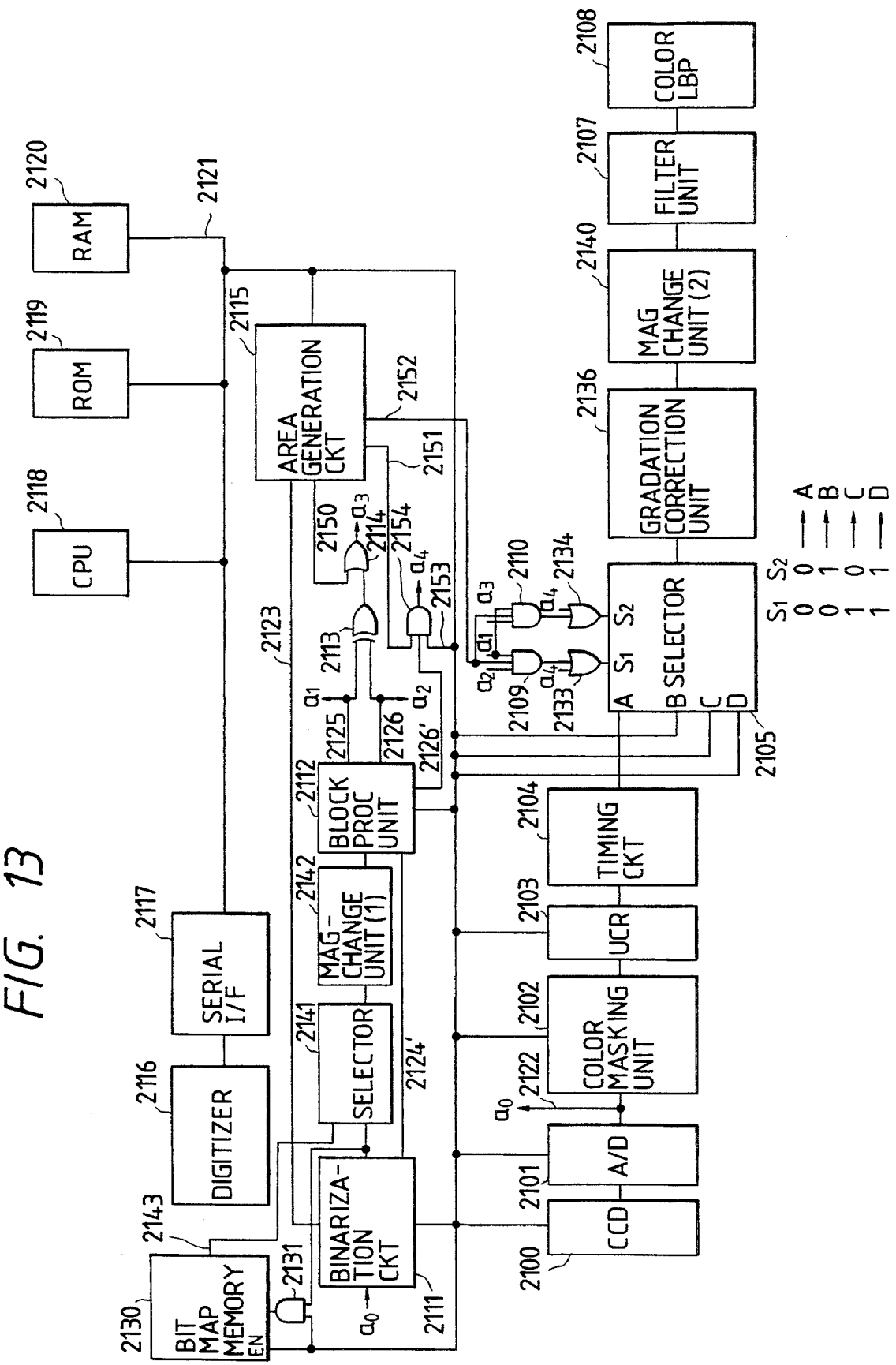
FIG. 13 is a circuit diagram of the binary digitizing circuit of a fourth embodiment of the present invention.

FIG. 13 is a block diagram of a fourth embodiment of the present invention. The image processing apparatus of the present embodiment is provided with a CPU 2118 connected to a CPU bus 2121; a ROM 2119 storing for example an image processing program, to be explained later; a RAM 2120 serving as an auxiliary memory; a bit map memory 2130; a selector 2142; a magnification varying unit (1) 2142; a CCD line sensor 2100; an A/D converter 2101; a color masking unit 2102; an undercolor removal unit 2103; a timing circuit 2104; a binary digitizing circuit 2111 for effecting binary digitizing on the A/D converted data; a block processing unit 2112; an area generation circuit 2115 for generating plural area signals and enable signals; a selector 2105 functioning based on a signal obtained from the block processing unit 2112; a gradation correction unit 2140; a magnification varying unit (2) 2106; a filter unit 2107; and a color laser beam printer 2108.

In the following there will be explained the process of forming a contoured character in the present embodiment.

Figure 14:
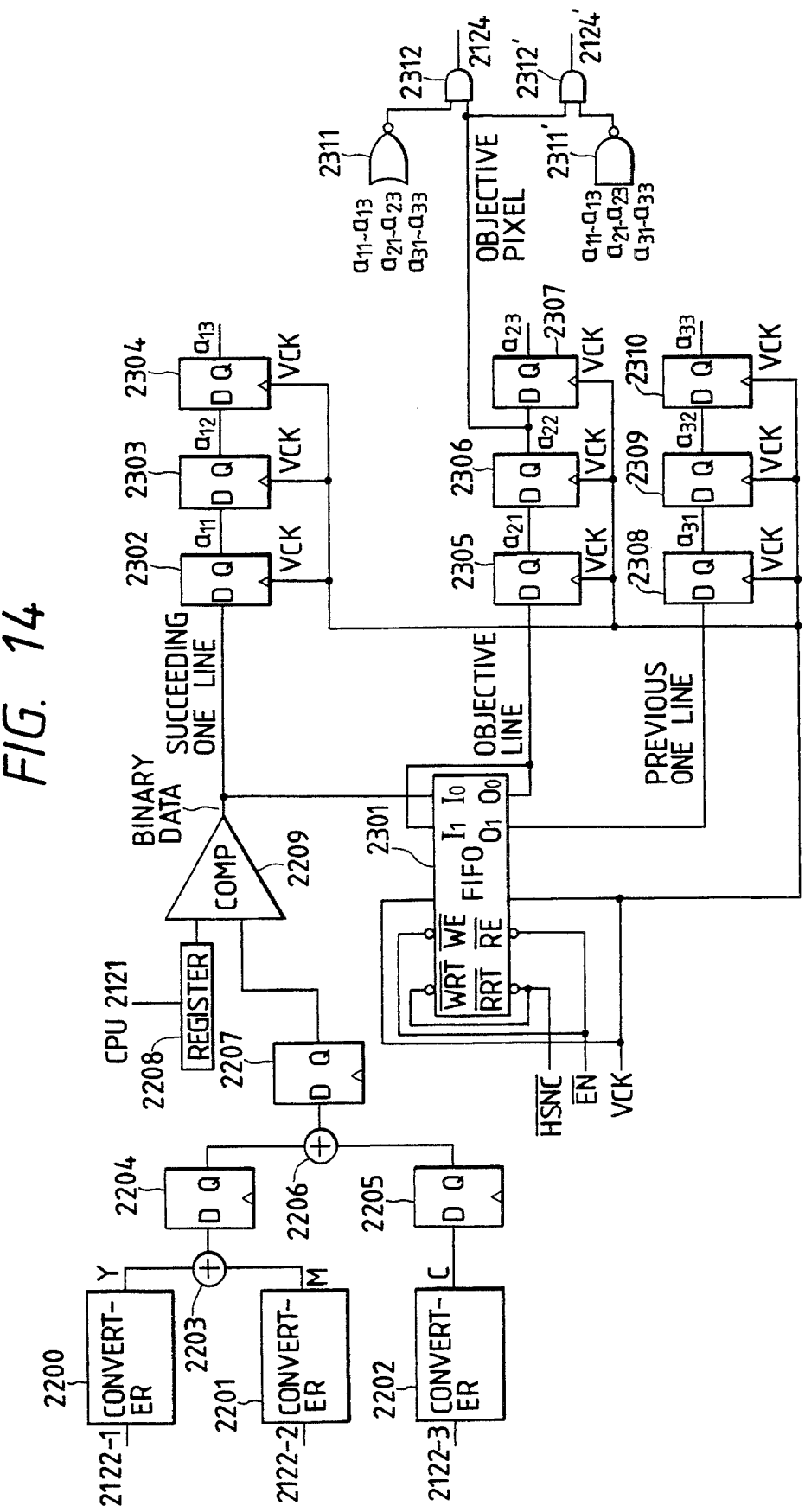
FIG. 14 is a block diagram of the entire image processing apparatus of the fourth embodiment.

FIG. 14 shows the binary digitizing circuit employed in the present embodiment. The R, G and B data 2122-1–2122-3 after A/D conversion are converted into Y, M and C data by converters 2200–2202. Then adders 2203, 2206 determine a signal representing Y+M+C, which is binary digitized by comparison, in a comparator 2209, with a value set by the CPU 2118 in a register 2208. In this manner there is generated an area signal which assumes a value "1" only at the position of a character as shown in FIG. 7C.

The binary digitized data are subjected to noise elimination in a succeeding processing as will be explained in the following.

Figure 9B:
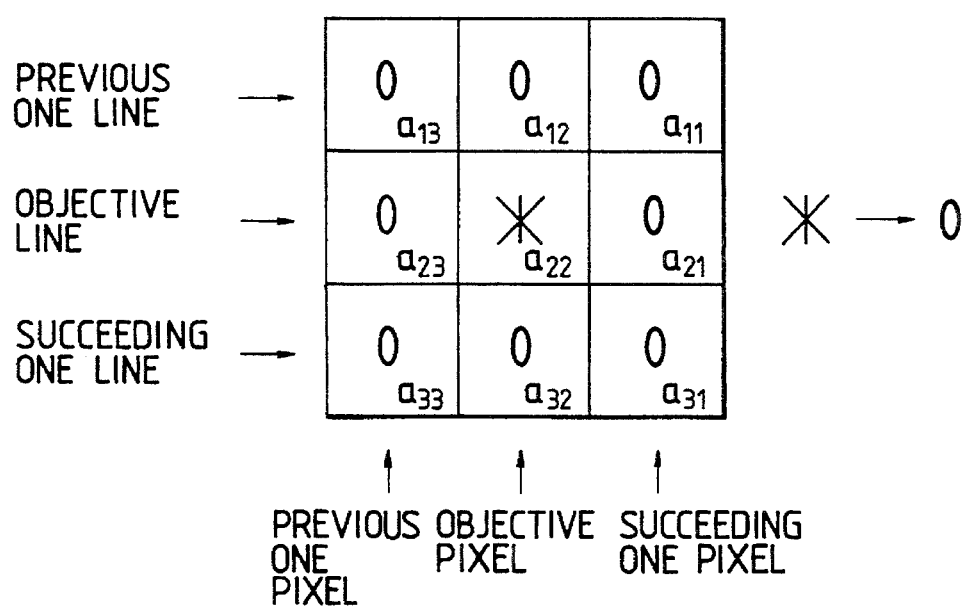

A noise elimination circuit is composed of a comparator 2209; a FIFO register 2301 for a one line delay; DF/F's 2302–2310, 2313; an 8-input NOR gate 2311; an 8-input NAND gate 2311'; AND gates 2312, 2312'; and a DF/F 2313. In a 3×3 pixel block defined around the contemplated pixel as shown in FIG. 9B, the contemplated pixel is digitized as "0" regardless of its value, if the surrounding eight pixels $a_{13}$–$a_{11}$, $a_{23}$, $a_{21}$, $a_{33}$–$a_{31}$ are all "0", and the digitized output is released as a binary signal 124.

Then extraction of a noise pixel (to obtain "1" for a noise pixel) is conducted by the gates 2311', 2312'.

More specifically, the NAND gate 2311' releases "1" if the eight pixels $a_{13}$–$a_{11}$, $a_{23}$, $a_{21}$, $a_{33}$–$a_{31}$ around the contemplated pixel $a_{22}$ are all "0".

Then the AND gate 2312' detects the isolated point (noise), and the detected noise is released as a binary signal 2124'.

FIGS. 15A–15D illustrate the details of the block processing unit 112.

Figure 15A:
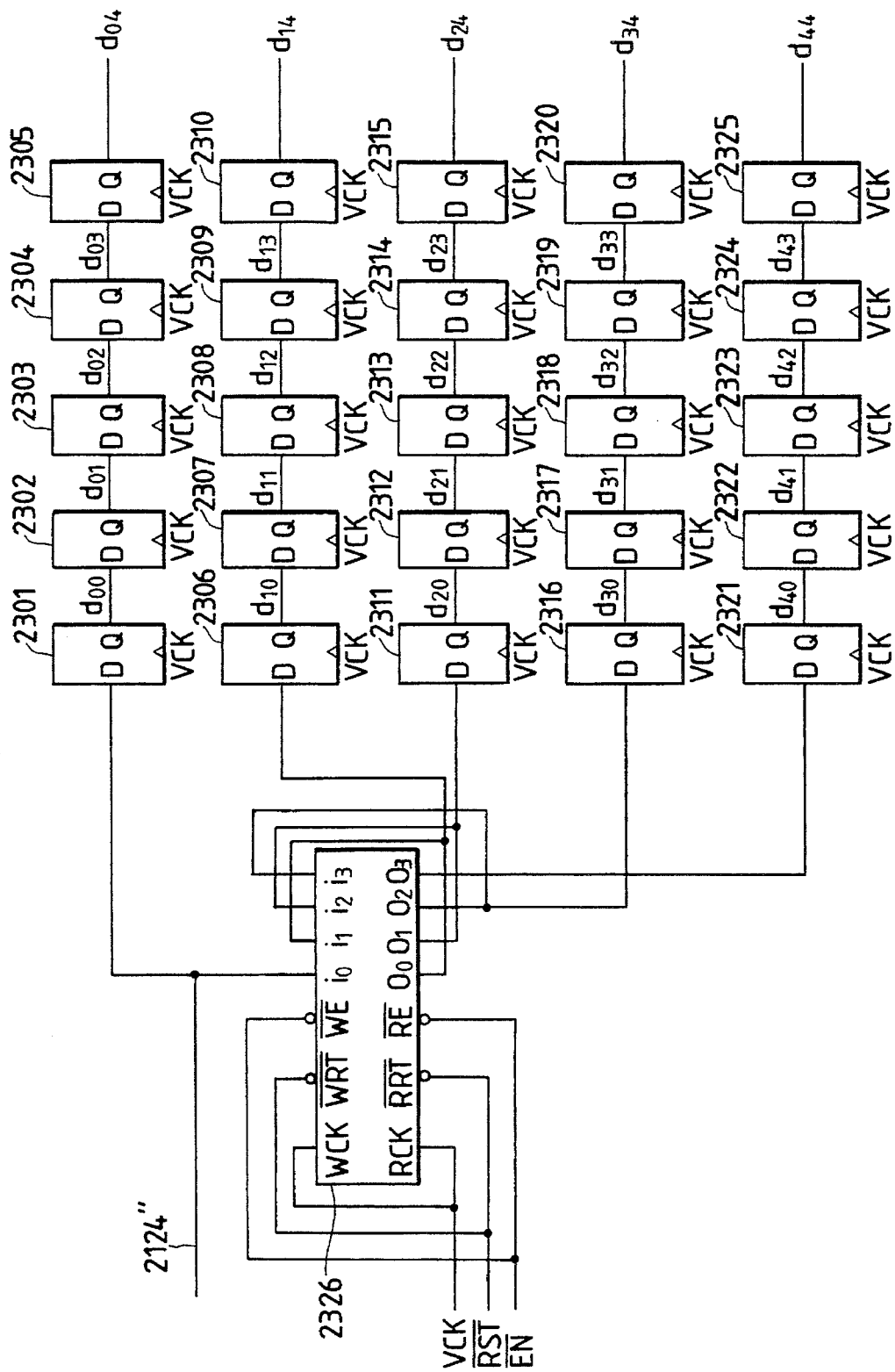
FIGS. 15A to 15D are circuit diagrams of the block processing circuit of the fourth embodiment.

In FIG. 15A, a FIFO register 2326 and DF/F's 2301–2325 constitute a circuit for forming a block of 5×5 pixels. More specifically, the FIFO memory 2326 generates a data block of synchronized five lines, and the DF/F's 2301–2325 generate a data block of 5×5 pixels.

Figure 15B:
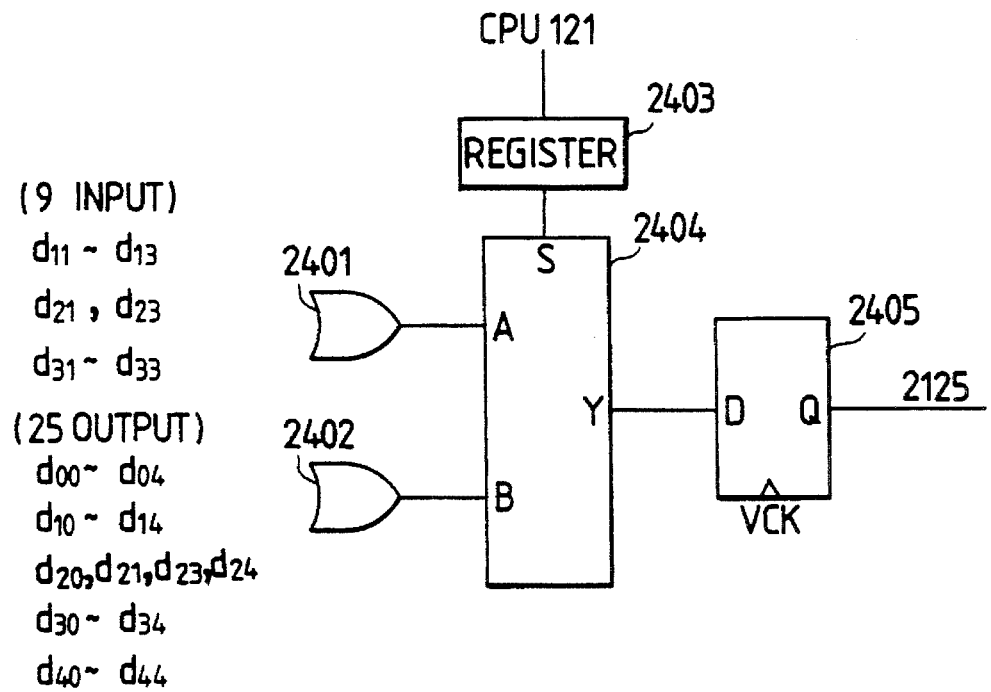

FIG. 15B shows a circuit for effecting a block processing on the pixel block formed in the circuit shown in FIG. 15A, and said block processing circuit is composed of OR gates 2401, 2402; a selector 2404 for selecting the input signal from the gate 2401 or 2402 according to the data set by the CPU 2121 in a register 2403; and a DF/F 2405 for timing control. Said selector 2404 for selecting the block size allows one to vary the width of the contour of the contoured character.

The OR gate 2401 releases an output signal "1" if a 3×3 pixel block defined around the contemplated pixel $a_{22}$ contains at least one signal (pixel) "1", while the OR gate 2402 releases an output signal "1" if a 5×5 pixel block defined around the contemplated pixel $d_{22}$ contains at least one signal "1". One of said output signals is selected by the selector 2404 and is released as a signal 2125.

Figure 15C:

FIG. 15C shows a DF/F 2406 which releases the through data of the contemplated pixel $d_{22}$ as a timing control signal 2126, for the signal 2124 entered into the block processing circuit.

Figure 15D:
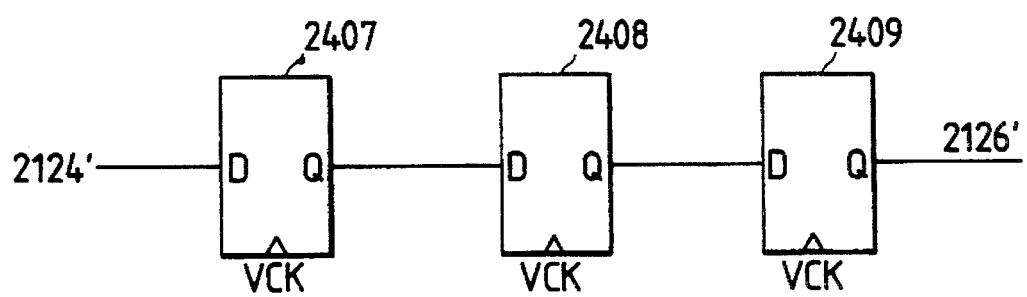

FIG. 15D shows DF/F's 2407, 2408, 2409 for releasing the signal 2124' indicating a noise pixel, as a signal 2126' after timing control.

Again referring to FIG. 13, among the output signals of the digitizing circuit 2111, the binary digitized signal 2124 is supplied to the selector 2141 and the AND gate 2131. Thus, when an enable signal EN is supplied from the CPU bus 2121 to the AND gate 2131, the binary digitized signal 2124 is recorded in the bit map memory 2130. In this manner the binary digitized information is stored in the memory 2130 after noise elimination. Also the data 2143 read from the bit map memory 2130 in response to the enable signal EN from the CPU bus 2121 are supplied to the selector 2141. Consequently the selector 2141 selects either the signal 2124 directly from the binary digitizing circuit, or the signal 2143 which has already been once stored in the bit map memory 2130, according to the control signal from the CPU bus 2121.

The output of said selector 2141 is subjected to a variation in the magnification, in the succeeding magnification varying circuit (1) 2142, according to the magnification set through the CPU bus 2121, and said variation can be achieved by a known process such as data skipping or data interpolation. The signal 2124" after the variation of magnification and the noise signal 2124' are supplied then to the block processing circuit 2112, which executes the above-explained process and releases a frame signal (enlarged character signal) 2125, a character signal 2126, and a timing-controlled noise signal 2126'.

The signals 2125, 2126 are supplied to an exclusive or logic sum circuit 2113 which supplies the succeeding AND gate with a signal "1" only in a case where the character signal and the frame signal are both "1" or both "0". The noise signal 2126' is supplied to an AND gate 2154.

FIG. 17 shows a truth table with para-$a_1$, $a_2$, $a_3$, $s_1$ and $s_2$ relating to the selector 2105, when the signals 2150, 2151, 2152 from the area generation circuit and the signal 2153 from the CPU bus are turned on.

Thus the character area and the frame area are respectively represented by the signals $a_1$ and $a_3$.

The output signal $a_4$ of the AND gate 2154, supplied to the OR gates 2133, 2134, always represents noise, and selector output D is always selected when said signal $a_4$ is "1".

The gates 2109, 2110, 2133, 1234 select the selector A for a background area, B for a frame area, C for a character area and D for a noise, and the noise area can be matched to the background color, for example by setting, in a register of thus selected D, the average value of the background color of a 3×3 pixel block defined around said noise pixel, as shown in FIG. 18. This can be achieved by fetching the image data from the undercolor removal unit 2103 into the CPU 2118 through the CPU bus 2121, calculating the average value in a predetermined block, and setting the result of said calculation in the register D of the selector 2105 through the CPU bus 2121.

It is also possible to store the color separated data of preceding pixels of a corresponding space, and to release thus stored data.

Furthermore, there may be employed any other means for filling the noise pixel with a color resembling the background color.

Also, the noise pixels, even when they are filled with white, or zero color-separated data, instead of the background color, are inconspicuous if they are small in size, so that it is conceivable to set zero data in the register D.

When an output as shown in FIG. 7B is desired, the area signal 2152 from the area generation circuit 2115 is shifted to "0", whereby are obtained signals S1=0, S2=0 in the character area. Thus the selector 2105 selects the original data A. On the other hand, in the hatched area, there are selected data C arbitrarily set by the CPU 2118. Thus an output image as shown in FIG. 7B can be obtained by a register setting for obtaining red color. (Said data can designate any arbitrary color, through the instruction from the CPU 2118.) By the same process as explained above with the signal 2152 as "1", the data B and C are selected respectively in the character area and the hatched area, so that the operator can arbitrarily select colors in these areas. Though not illustrated in FIG. 13, it is also possible to apply different contoured character processings to plural areas, by providing selectors B, C, D with plural registers and switching said registers by plural area signals generated by the area generation circuit 2115.

Figure 16A:
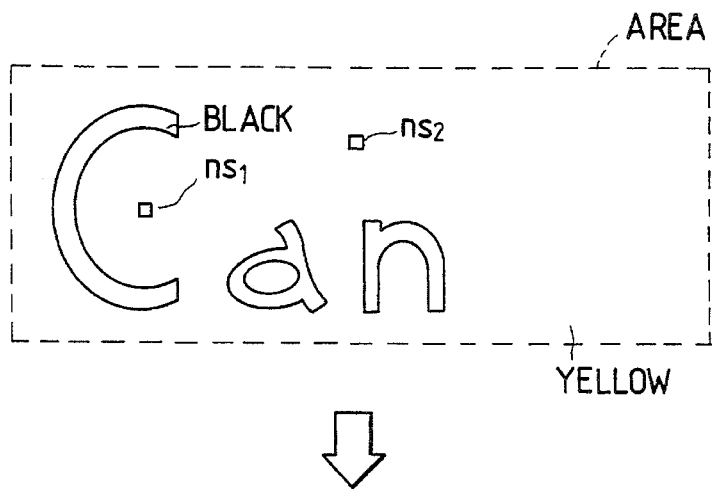
FIGS. 16A to 16C are views illustrating noise elimination processing according to the present invention.
Figure 16B:
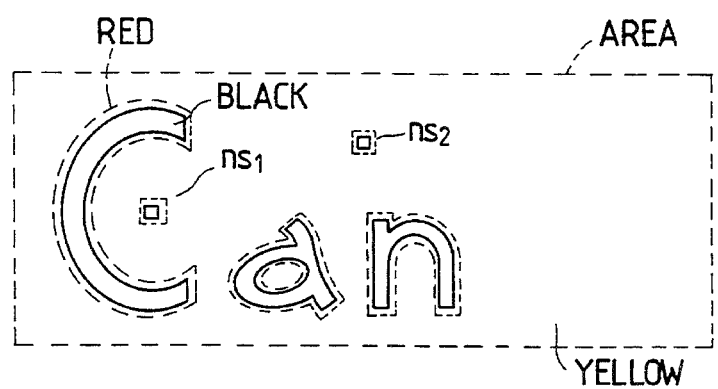
Figure 16C:
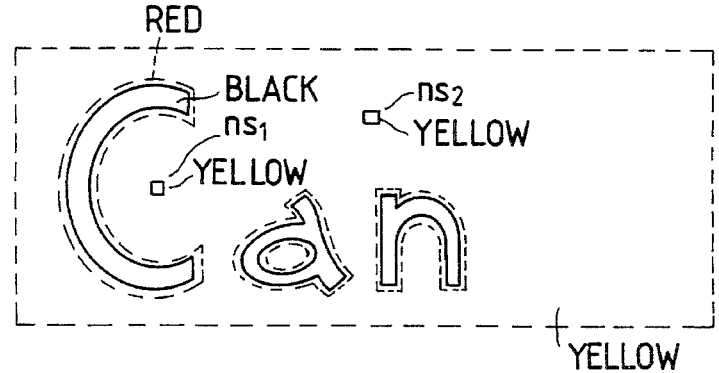

In the above-explained contoured character process in an image shown in FIG. 16A, the dots ns1, ns2 are regarded as noise, and do not appear in the output as the digitized signal 2124 becomes zero. As the CPU 2118 sets the color-separated data of a pre-designated point in the register in advance for the noise pixel 2124', the contoured character process applied to the image shown in FIG. 16A provides an output shown in FIG. 16C, in which the noise pixels are matched to the background color and the contoured character process is applied only to the desired areas. In case of applying the contoured character process to the data from the bit map memory 2130, the original image data are binary digitized in the digitizing circuit 2111 and the digitized data are stored in the bit map memory 2130 in the write-in mode (EN="0"). Said digitized data have already been subjected to noise elimination. Then another original image is placed for synthesis. The data of the bit map memory are read in the read-out mode (EN="1"), and the output 2143 of said memory is selected by the selector 2141, whereby the image synthesis is achieved with the contoured character process applied only to the data of the bit map memory. The image synthesis is conducted by switching the selector 2105 according to the area signal 2152. The process of generating the contoured characters will not be explained as it is the same as explained before.

Also the image synthesis of the data of the bit map memory and the data of an original image with a change in magnification is achieved by applying a magnification change, for said original image, by data skipping or interpolation by means of the magnification varying unit (2) 2140 in the main scanning direction and by speed control of the scanning operation in the sub scanning direction. Also the magnification change for the characters to be synthesized, is conducted by the magnification varying unit (1) 2142 both in the main scanning and sub-scanning directions.

As explained in the foregoing, even in an image synthesis, the characters and another image can be independently varied in magnification, and the noise elimination can be conducted in the original sized image, regardless of the desired magnification.

As explained in the foregoing, the present embodiment allows one to eliminate noise from the image, by the use of block processing means (means for conducting a process utilizing a contemplated pixel and surrounding pixels) before or after binary digitizing.

In addition, a highly precise image processing is made possible, by the use of means for replacing pixels, identified as noise, with the background color.

Furthermore, even in a character synthesis involving a variation in magnification and utilizing a memory, the noise elimination can be conducted on the original-sized image by the use of means for noise elimination prior to the change in image magnification.

In summary, the present embodiment has an advantage of achieving highly precise image processing with a compact circuit structure, in which the precision of noise elimination is not affected by the magnification varying process, by (1) replacing the area identified as noise with the background color in the binary digitizing process, and (2) effecting the noise elimination prior to the variation of image magnification at the character synthesis utilizing the result of binary digitizing.

As explained in the foregoing, the present invention allows to reproduce the image of high quality with a simple structure and without the influence of noises.

Embodiment 5

In the following there will be explained an embodiment of the present invention capable of providing, in real time, an output image in which at least a past of the input image data and a peripheral area thereof are colored in arbitrary colors in plural areas and in which the widths of said peripheral areas are independently variable, by employing means for binary digitizing the input image data and means for magnifying the area obtained by said binary digitizing means (with plural sizes and with plural area signals).

Figure 19:
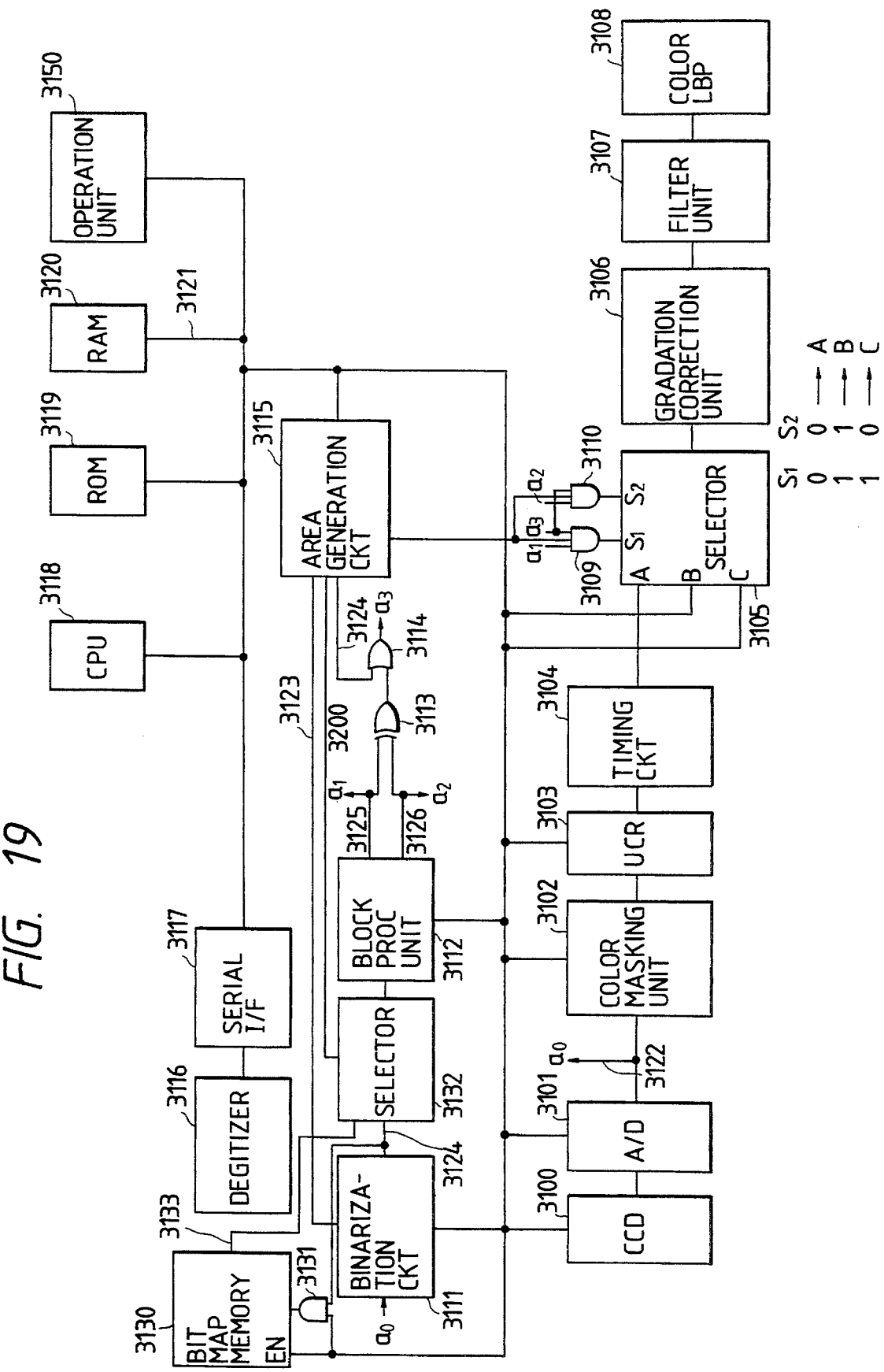
FIG. 19 is a block diagram of another embodiment.

FIG. 19 is a block diagram of the present embodiment, wherein are provided a CPU 3119 connected to a CPU bus 3121; a ROM 3119 storing programs, etc.; a RAM 3120 serving as an auxiliary memory; an operation unit 3150 for various operations such as mode setting or color designation; a CCD line sensor 3100; an A/D converter 3101; a color masking unit 3102; an undercolor removal unit 3103; a timing circuit 3104; a binary digitizing circuit 3111 for effecting the binary digitization on the A/D converted data; a bit map memory 3130; an AND gate 3131; a block processing unit 3112; an area generation circuit 3115 for generating plural area signals and enable signals; a selector 3105 functioning according to the signal obtained by block processing; a gradation correction unit 3106; a filter unit 3107; a color laser beam printer 3108; an exclusive logic sum circuit 3113; an OR gate 3114; and AND gates 3109, 3110.

In the following there will be explained the process for forming a contoured character.

The binary digitizing circuit in FIG. 19 is the same as that shown in FIG. 2, and will not, therefore, be explained.

Figure 20A:
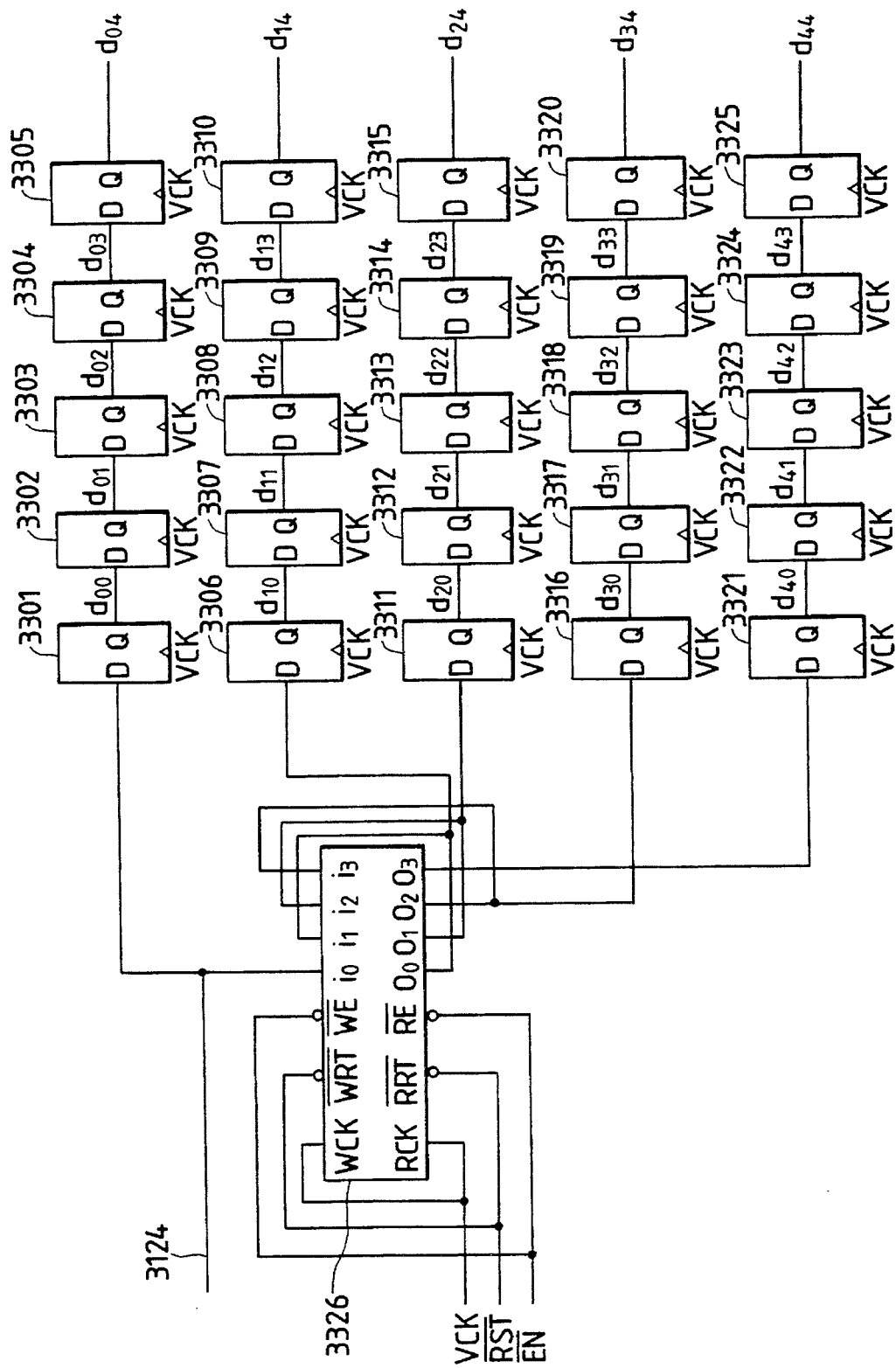
FIGS. 20A and 20B are circuit diagrams of a block processing circuit.

FIG. 20 is a block diagram of the block processing unit 3112, for generating a block of 5×5 pixels, around a and including a pixel $d_{22}$ of interest. A FIFO memory 3326 generates a data block of five synchronized lines, and DF/F's 3301–3325 generate a data block of 5×5 pixels.

Figure 20B:
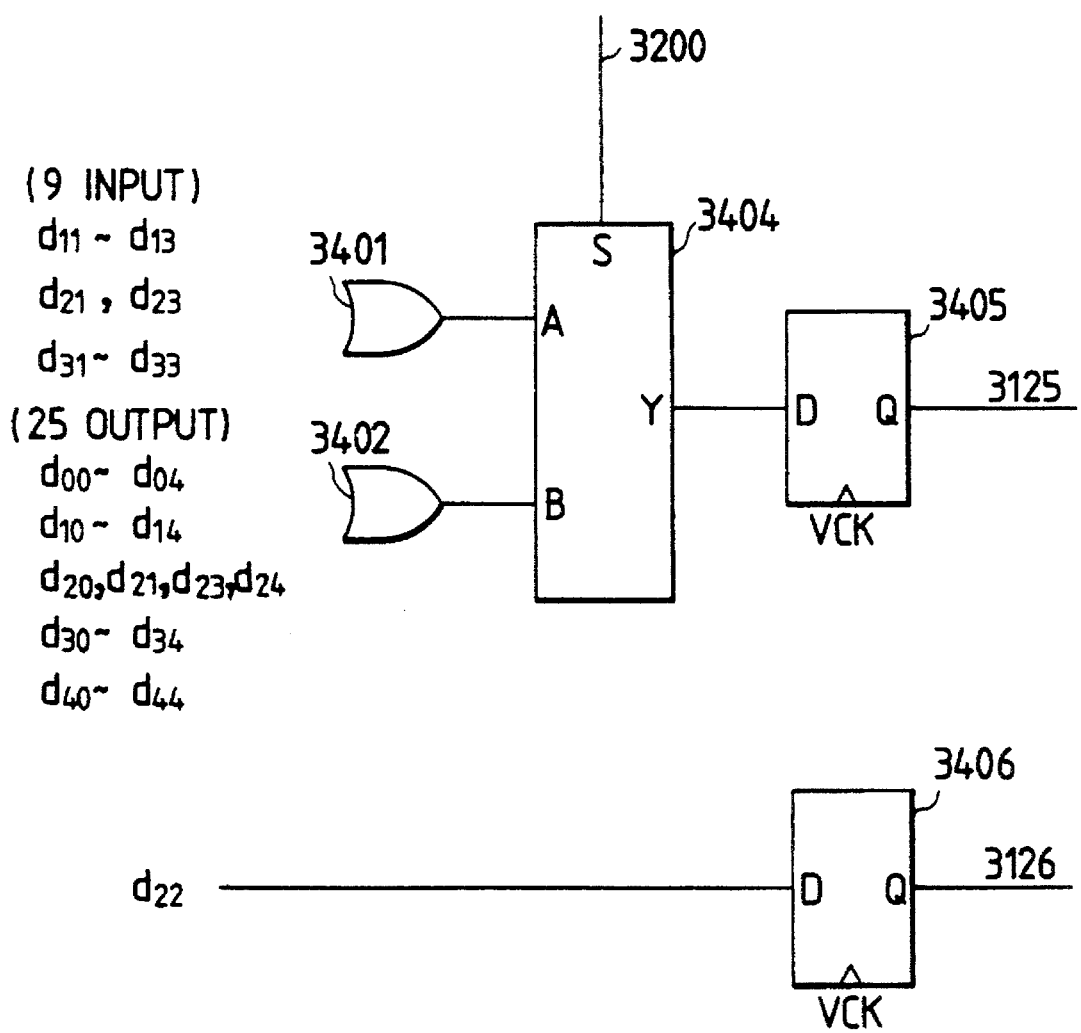

FIG. 20B shows a part including OR gates 3401, 3402 for effecting the actual block processing, and another part for releasing the through data. The OR gates releases a signal "1" if a 3×3 block defined around the pixel $d_{22}$ contains at least one signal "1", while the OR gate 3402 releases a signal "1" if a 5×5 block defined around the pixel $d_{22}$ contains at least one signal "1", and said output signals are selected and released as a signal 3125 by the selector 3404, in response to an area signal 3200 which is supplied through the CPU bus 3121 by an instruction from the operation unit 3150. It is therefore possible to vary the width of line on a real-time basis, and to designate peripheral areas of different widths for plural areas.

Thus there can be obtained an area signal corresponding to a thicker character as shown in FIG. 7D.

If an output as shown in FIG. 7B is desired, the area signal 3124 is shifted to "L" (namely "low" or "0"), whereby signals S1=0, S2=0 are obtained in the character area. Thus the selector 3105 selects the original image data A in said character area. In the hatched area, there are selected arbitrary data C set by the CPU 3118. The output image as shown in FIG. 7B can be obtained by so setting the data C in said register as to give red color to the hatched area.

The same process with the area signal 3124 at the "H" ("high"or "1") level selects the data B in the character area and the data C in the hatched area, whereby the operator can arbitrarily select colors for both areas. Though not illustrated in FIG. 20, it is rendered possible to apply different contoured character processes to plural areas, by providing the selectors B, C with plural registers and switching said registers by plural area signals generated by the area generation circuit 3115.

In a case of applying the contoured character process to the data from the bit map memory, the original image data are binary digitized in the digitizing circuit 3111 and the digitized data are stored in the bit map memory 3130 in the write-in mode (EN="0"). Then another original image is placed for synthesis. The data of the bit map memory are read in the read-out mode (EN="1"), and the output 3133 of said memory is selected by the selector 3132, whereby the image synthesis is achieved with the contoured character process applied only to the data from the bit map memory. The process of generating the contoured characters will not be explained as it is the same as explained before.

The colors Y, M, C and Bk can be regulated or set in percentage (%) on a liquid crystal touch panel 1109 of the operation unit 3150. In the present embodiment, each color density is represented by 8 bits, or values from 00 to 255, so that a variation of 1% corresponds to 2.55 in digital value. For color setting of (Y, M, C, Bk)=(y%, m%, c%, k%), the actually set values are represented by (2.55y, 2.55m, 2.55c, 2.55k), and rounded-off integers are actually stored in the RAM 3120 by the CPU 3118. Also in case of color density regulation by percentage, a variation by $\Delta$%, a value obtained by addition of 2.55$\Delta$ in case of density increase or by subtraction of 2.55$\Delta$ in case of density decrease can be stored in the RAM 3120.

As explained in the foregoing, the color of the character and that of the contour can be arbitrarily selected.

Procedure for Character Synthesis

Figure 21B:
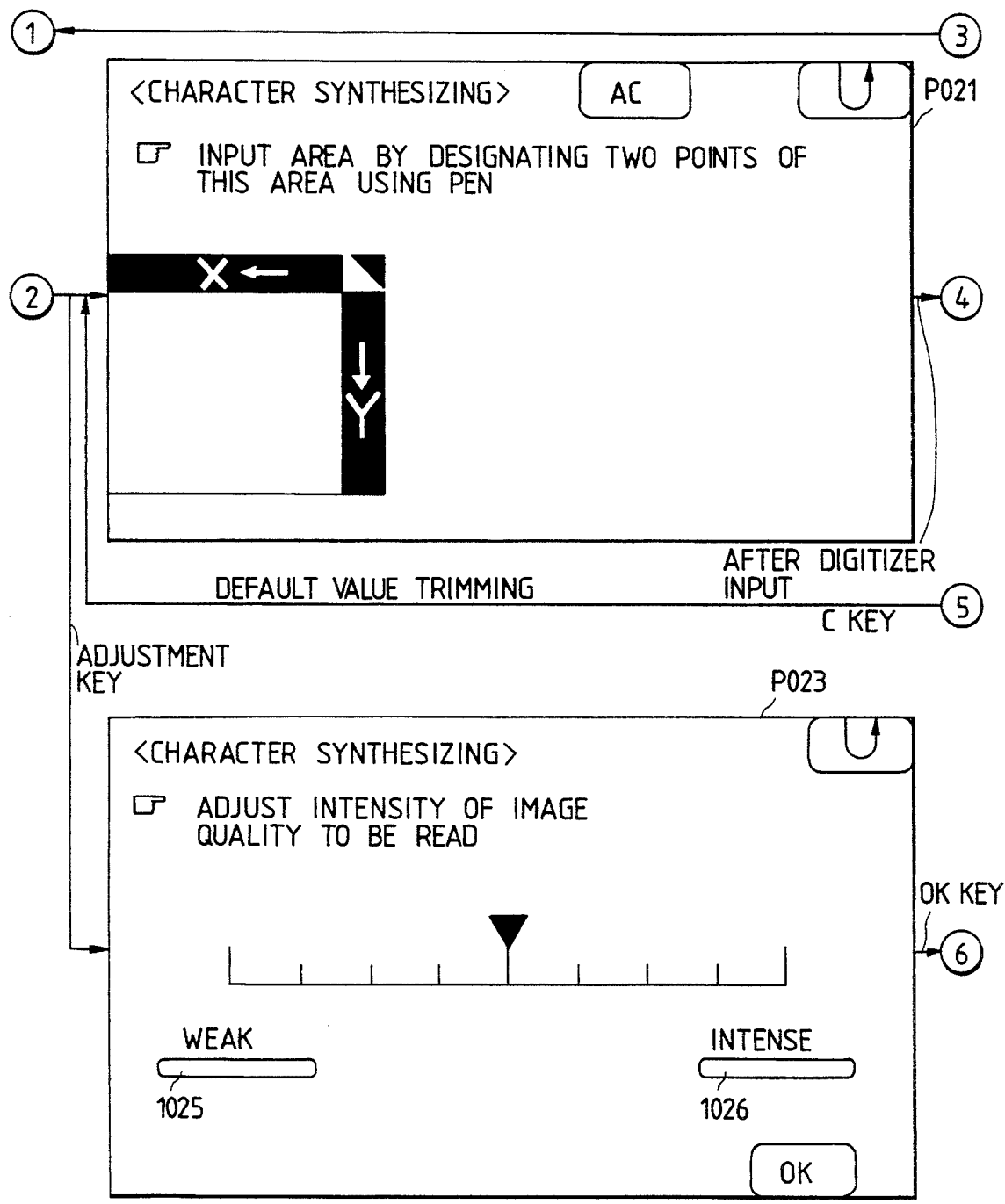
FIGS. 21, consisting of FIGS. 21A to 21C, and 22, consisting of FIGS. 22A to 22F, are views showing the procedure of character synthesis.
Figure 21C:
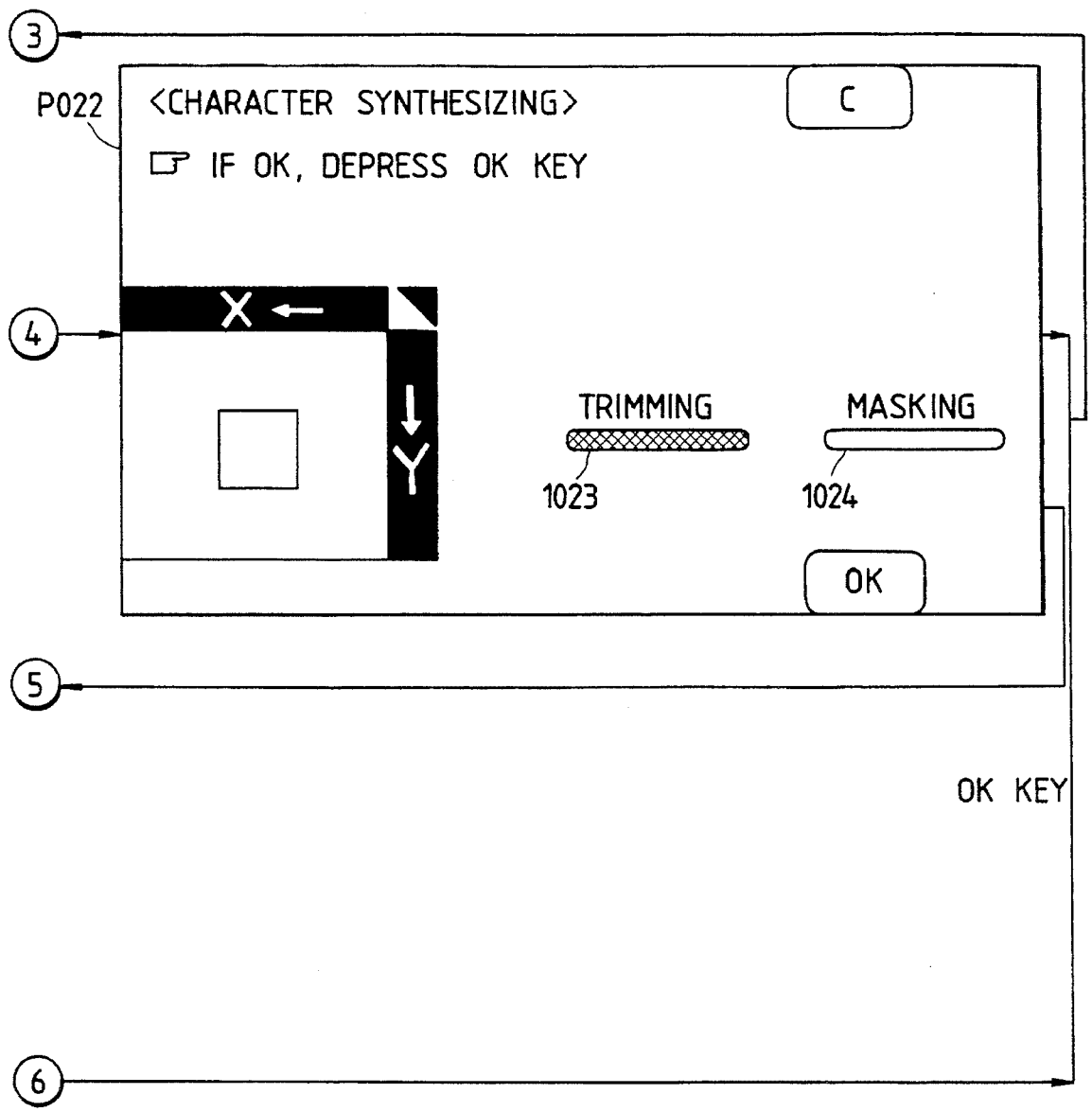
Figure 22B:
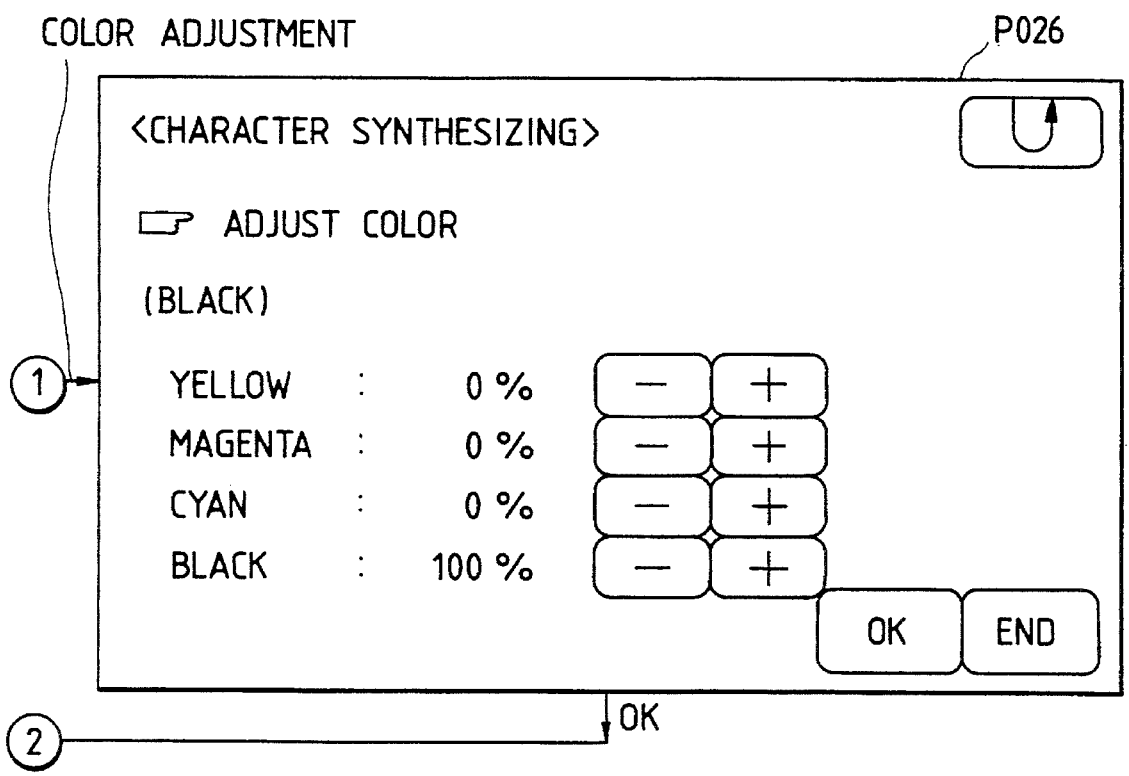
Figure 22C:
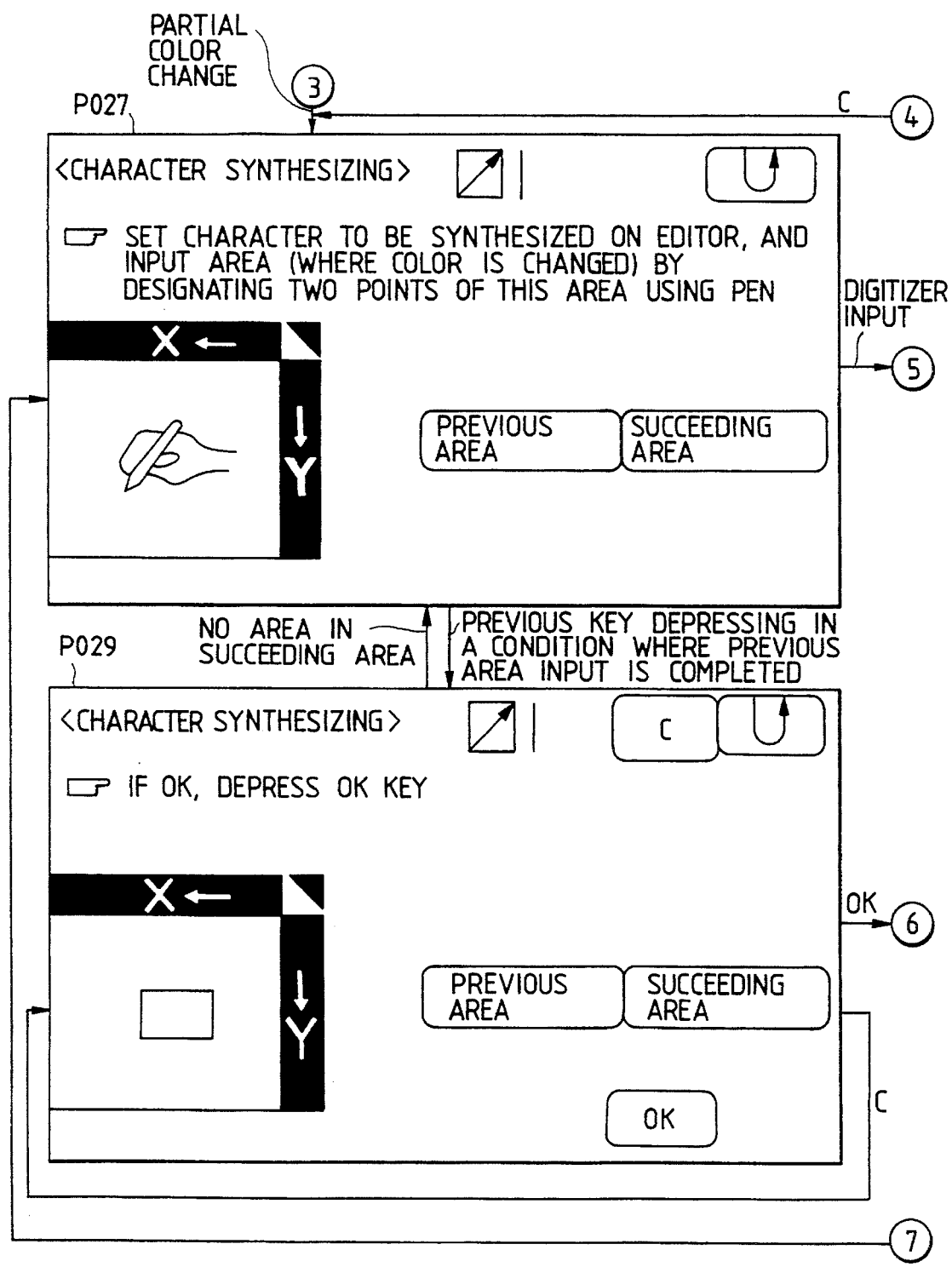
Figure 22D:
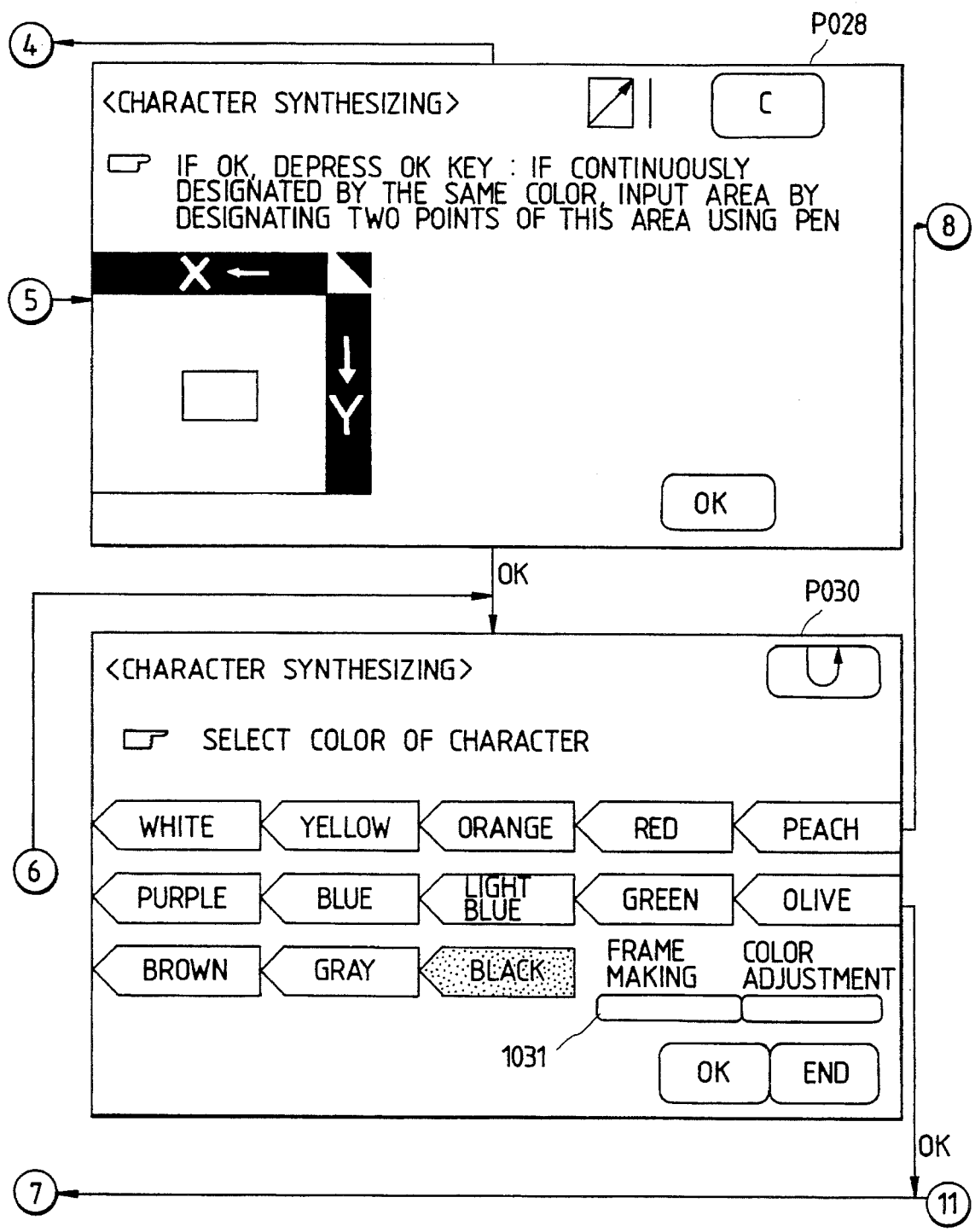
Figure 22E:
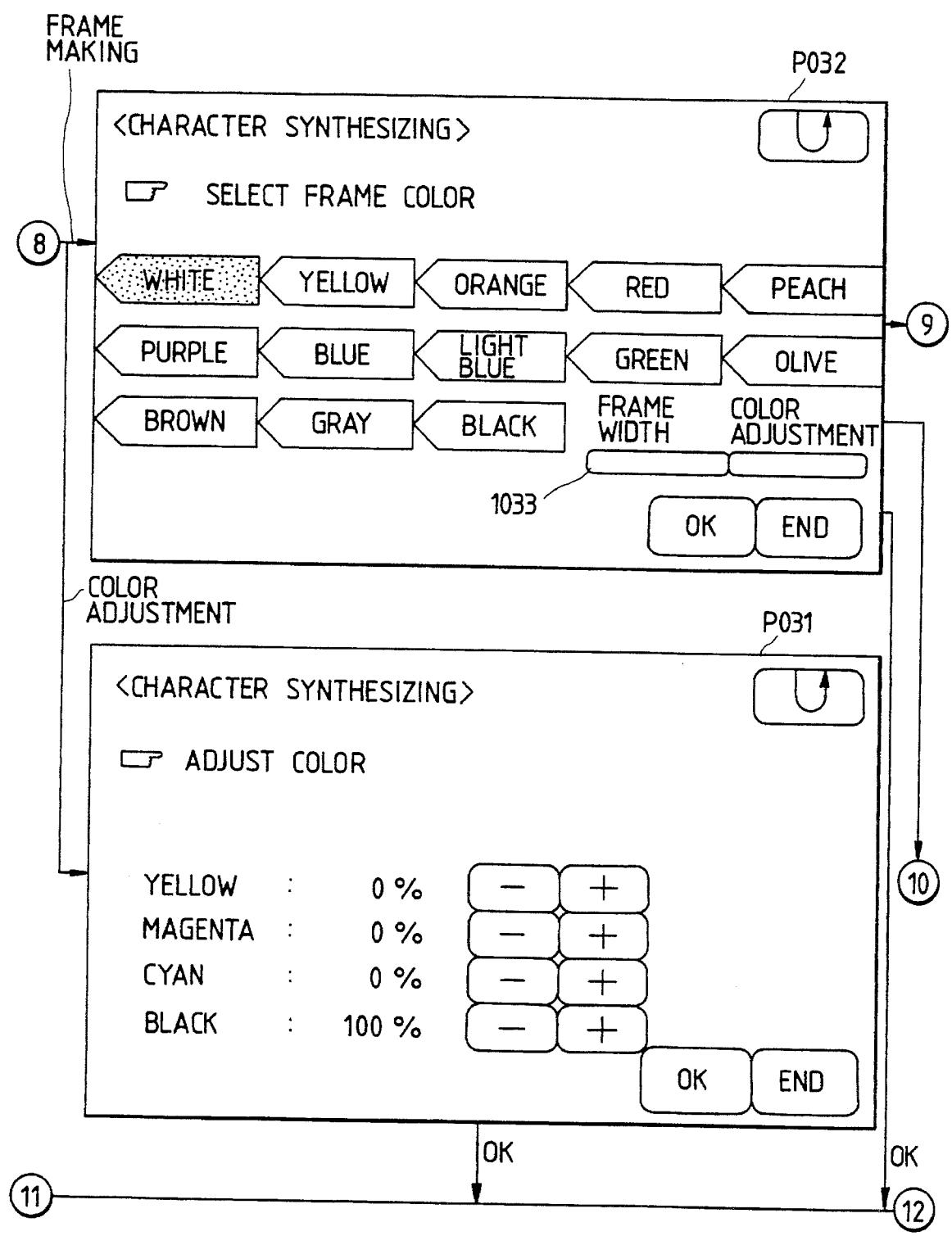

In the following there will be explained the procedure for character synthesis, with reference to FIGS. 21 and 22. In response to the depression of a character synthesis key 1114 of the operation unit, the liquid crystal display unit 1109 provides a display as shown in P020. Said display unit 1109 is composed of a touch panel display, which is capable of providing a display and of key inputs by actuating keys displayed thereon. At first a character original to be synthesized is placed on the platen glass and a key 1020 is depressed, whereby are conducted the reading of said character original, binary digitizing and storage of the image information in the bit map memory 3130. The image area to be memorized can be designated by depressing a touch key 1021 in the display P020 to obtain a display P021, placing said character original on the digitizer 58, and designating a desired area by two points thereof, with the pointer pen of said digitizer. Upon completion of said designation, the display changes to a state P022, in which touch keys 1023, 1024 are used to select a trimming operation for reading the image inside the designated area, or a masking operation for reading the image outside said area. Some originals may contain characters which are difficult to extract in the binary digitizing, for example yellowish characters. In such a case it is possible to shift the display to a state P023 by means of a touch key 1022 in the display P020 and to regulate the slice level of binary digitizing with the touch keys 1025 and 1026, which respectively raises or lowers the slice level of digitization, thereby weakening or enhancing the character detection.

As the slice level can be manually regulated as explained above, the binary digitization can be suitably conducted according to the color and thickness of the original characters.

It is also possible, by designating an area with the digitizer 3116, to locally vary the slice level in said area.

Such change in the slice level in a designated area allows to achieve satisfactory binary digitizing for all the characters, for example in case an original of black characters contains yellow characters, by selecting suitable different slice level for such black and yellow characters.

Upon completion of the original reading, the display unit 1109 shifts to a state P024 shown in FIG. 22.

For selecting the contoured character process, a touch key 1027 in the display is depressed to obtain a state P025, in which a character color to be synthesized is selected from the displayed colors. The character color can be selected, as shown in FIG. 22, from white, yellow, orange, red, peach, purple, blue, light blue, green, olive, brown, gray and black. If a touch key 1030 is depressed in the state P025, the display is changed to a state P026 for color regulation, in which any desired color can be obtained by increasing or decreasing the yellow, magenta, cyan and black colors with respective $\boxed{+}$ or $\boxed{-}$ key by a pitch of 1% as explained above. The designated color value is set by the CPU 3118 as the data B in the register of the selector 3105, through the CPU bus 3121.

It is also possible to partially change the color of the character. In this case a touch key 1029 is depressed to obtain a display P027 in which an area is designated with the digitizer 3116. Then, in a display P030, the character color is selected in the same manner as explained above. If the area designated in this step is same as that designated previously area key and an OK key are depressed in succession in the display P029, whereby the repeated area designation can be dispensed with. For designating the color contour to be attached to the edge of the character, a touch key 1031 in the display P030 is depressed to a display P032, in which the contour color is selected. In this case the color regulation is also possible in a display P033 as explained above. Also the width of the contour can be regulated in a display P041 obtained by a touch key 1033. The width of the contour can be varied by changing the size of the block processing as explained before.

In the above-mentioned color selection in the display P025, the display is shifted to a state P026 by the touch key 1130, for enabling the adjustment of the selected color.

The designation of color may also be achieved by selecting the position of a desired color of the original placed on the platen glass with the digitizer 3116, and reading said color with the CCD 3100 in a pre-scanning operation.

It is furthermore possible to effect the contoured character processes with different colors for plural areas, by repeating the above-explained procedure.

Figure 23:
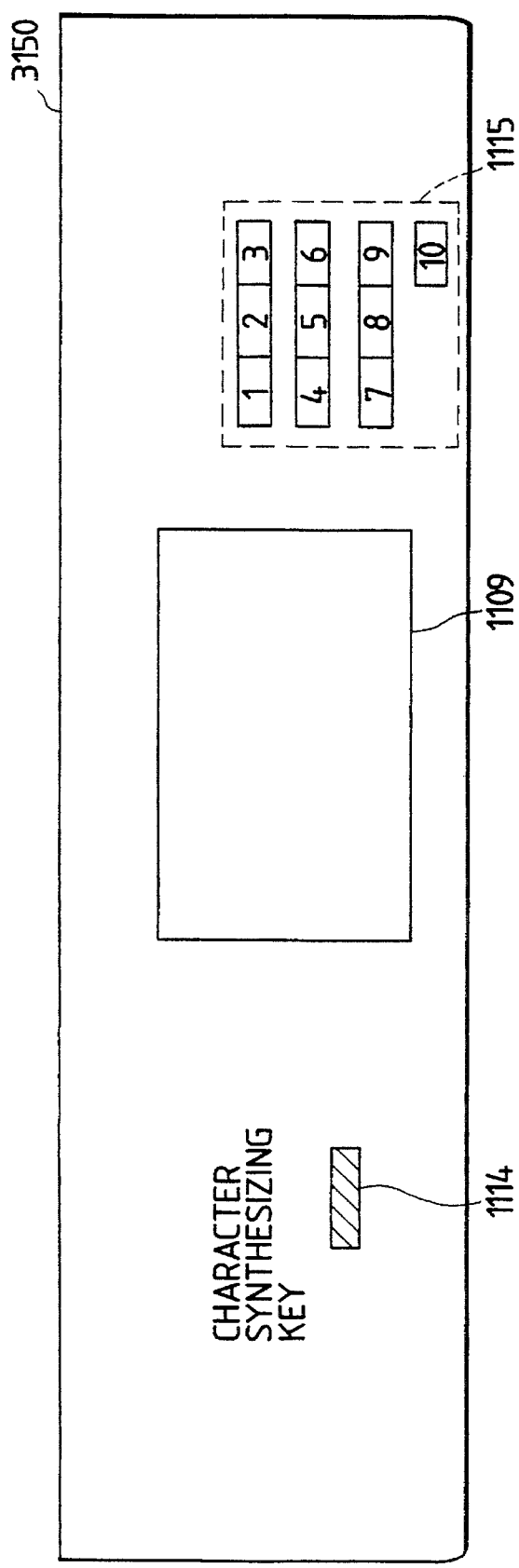
FIG. 23 is a view of an operation unit.

As explained in the foregoing, the present embodiment enables the contoured character processes with different colors in plural areas. In said operation, the character and the contour can be converted into desired colors, which can be defined by yellow, magenta, cyan and black with a pitch of 1%. Furthermore, said color values may be entered by numeral keys 1115 (FIG. 23) instead of the touch keys. Said color values may be roughly defined or finely defined. Also the width of the contour can be arbitrarily varied, by changing the block size of the above-explained block processing.

Though the width of contour in the present embodiment is selected by a 3×3 block or a 5×5 block, the size of block is not limited to such sizes. It is also possible to select said size manually, or automatically according for example to the size of character.

Also, the area to be designated is not limited to a rectangular area.

As explained in the foregoing, image editing such as contoured character process can be realized simply and on a real-time basis, by a simple hardware structure consisting of binary digitizing of input image data and block processing, thus providing wide applications particularly in various design processes.

Though the foregoing embodiments have been explained in relation to image output by a laser beam printer, there may be employed other color printers such as a dot printer, a thermal transfer printer or an ink jet printer in which the ink is heated to cause liquid film boiling by thermal energy, thereby emitting liquid droplets by the pressure of generated gas, as disclosed in U.S. Pat. Nos. 4,723,129 and 4,740,793.

Also instead of output by a printer, it is also possible to store the image data in an image file or to transmit the image data through an image communication unit.

Furthermore the image data may be entered from an electronic still camera, a video camera or a computer through an interface, instead of the CCD.

Furthermore the contoured character process of the present invention is applicable not only to a still image but also to a moving image.

What is claimed is:

1. An image processing apparatus comprising:
   a) extraction means for extracting an outline of an image represented by input image data;
   b) process means for coloring the outline extracted by said extraction means with a finite width; and
   c) identifying means for identifying any isolated points in the image; and
   d) control means for controlling said process means so that the outline of the image other than any such isolated point in the image is colored, while the outline of any such isolated point is not colored, so that any such isolated point is retained in the image and the outline of any such isolated point is not colored.

2. An apparatus according to claim 1, wherein said extraction means is adapted to extract the contour by binarizing the input image data.

3. An apparatus according to claim 2, wherein said extraction means is adapted to extract the contour by a block process utilizing binarized input image data.

4. An apparatus according to claim 1, wherein said process means comprises designation means for designating a color to be given to the contour.

5. An apparatus according to claim 1, wherein said control means is adapted to disable contour extraction of an isolated point in the input image data by said extraction means, by means of a predetermined filter process applied to the input image data, thereby prohibiting the coloring of the isolated point.

6. An apparatus according to claim 5, wherein said predetermined filter is a median filter.

7. An apparatus according to claim 5, wherein said predetermined filter is a smoothing filter.

8. An image processing apparatus comprising:
   a) extraction means for extracting an outline of an image represented by input image data;
   b) process means for coloring the outline extracted by said extraction means, the outline being colored with a controllable width; and
   c) identifying means for identifying any isolated points in the image; and
   d) control means for controlling said process means so that the outline of the image, other than any such isolated point in the image, is colored while the outline of any such isolated point is not colored, so that any such isolated point is retained in the image and the outline of any such isolated point is not colored
   wherein said process means comprises means for varying the width of coloring of the outline.

9. An image processing method comprising the steps of:
   a) extracting an outline of an image represented by input image data;
   b) identifying any isolated point in the image; and
   c) coloring the outline of the image extracted in said extracting step with a finite width,
   wherein said coloring is performed so that the outline of the image, other than any isolated point in the image identified in said identifying step, is colored, while the outline of any such isolated point is not colored, so that any such isolated point is retained in the image and the outline of any such isolated point is not colored.

* * * * *

UNITED STATES PATENT AND TRADEMARK OFFICE
CERTIFICATE OF CORRECTION

PATENT NO. : 5,485,529

DATED : January 16, 1996

INVENTOR(S): MITSURU KURITA ET AL.

Page 1 of 5

It is certified that error appears in the above-identified patent and that said Letters Patent is hereby corrected as shown below:

Drawings:
SHEET 19 OF 31

FIG. 19, "DEGITIZER" should read --DIGITIZER--.

COLUMN 2

Line 18, "are" should read --and--.
    Line 35, "showing" should be deleted.

COLUMN 3

Line 24, "programs" should read --programs,--.
    Line 29, "color reader)" should read --"color reader")--.
    Line 30, "color" (second occurrence) should read --"color--.
    Line 31, "printer)" should read --printer")--.
    Line 63, "panel 3150" should read --panel 20--.

COLUMN 4

Line 45, "drum 176," should read --drum 716,--.
    Line 47, "drum 761," should read --drum 716,--.

UNITED STATES PATENT AND TRADEMARK OFFICE
CERTIFICATE OF CORRECTION

PATENT NO. : 5,485,529

DATED : January 16, 1996

INVENTOR(S) : MITSURU KURITA ET AL.

It is certified that error appears in the above-identified patent and that said Letters Patent is hereby corrected as shown below:

COLUMN 5

```
Line 43, "noises" should read --noise--.
Line 44, "FIGS. 8A 9A," should read --FIG. 8A,--.
Line 66, "AND gate 132" should read
        --AND gate 312--.
```

COLUMN 6

```
Line 23, "sides B." should read --side B.-- and
         "side A" shuld read --sides A--.
Line 49, "Also" should read --Also,--.
Line 65, "Also" should read --Also,--.
Line 67, "a₁1. Also" should read --a₁=1. Also,--.
```

COLUMN 7

```
Line 1,  "Also" shold read --Also,--.
Line 4,  "Thus" should read --Thus,--.
Line 9,  "is," should read --area,-- and
         "are" should read --is--.
Line 10, "and" should read --and,--.
Line 15, "obtain" should read --obtained--.
Line 28, "noises are" should read --noise is--.
Line 32, "Also" should read --Also,--.
Line 66, "isolated" should read --isolated point--.
```

UNITED STATES PATENT AND TRADEMARK OFFICE
CERTIFICATE OF CORRECTION

PATENT NO. : 5,485,529

DATED : January 16, 1996

INVENTOR(S): MITSURU KURITA ET AL.

It is certified that error appears in the above-identified patent and that said Letters Patent is hereby corrected as shown below:

COLUMN 8

Line 6, "noises" should read --noise--.

COLUMN 9

Line 9, "one line" should read --one-line--.
    Line 64, "Also" should read --Also,--.

COLUMN 10

Line 16, "or" should read --OR--.
    Line 31, "1234" should read --2134--.
    Line 43, "color separated" should read --color-separated--.

COLUMN 11

Line 30, "Also" should read --Also,--.
    Line 36, "Also" should read --Also,--.
    Line 37, "synthesized," should read --synthesized--.

UNITED STATES PATENT AND TRADEMARK OFFICE
CERTIFICATE OF CORRECTION

PATENT NO.   :  5,485,529

DATED        :  January 16, 1996

INVENTOR(S)  :  MITSURU KURITA ET AL.

It is certified that error appears in the above-identified patent and that said Letters Patent is hereby corrected as shown below:

COLUMN 12

Line 3, "noises." should read --noise.--.
    Line 37, "a" (second occurrence) should be deleted.
    Line 43, "OR" should read --OR--.
    Line 45, "signal" (first occurrence) should read
          --signal (pixel)--.

COLUMN 13

Line 48, "digitizer 58," should read --digitizer,--.

COLUMN 14

Line 58, "Also" should read --Also,--.
    Line 59, "varied," should read --varied--.

COLUMN 15

Line 16, "Also" should read --Also,--.
    Line 19, "Furthermore" should read --Furthermore,--.
    Line 23, "Furthermore" should read --Furthermore,--.
    Line 31, "and" should be deleted.
    Line 41, "contour" should read --outline--.
    Line 44, "contour" should read --outline--.

UNITED STATES PATENT AND TRADEMARK OFFICE
CERTIFICATE OF CORRECTION

PATENT NO. : 5,485,529

DATED : January 16, 1996

INVENTOR(S) : MITSURU KURITA ET AL.

It is certified that error appears in the above-identified patent and that said Letters Patent is hereby corrected as shown below:

COLUMN 16

```
Line 3,  "contour." should read --outline.--.
Line 5,  "contour" should read --outline--.
Line 20, "and" should be deleted.
Line 28, "colored" should read -colored,--.
```

Signed and Sealed this

Second Day of July, 1996

*Attest:*

BRUCE LEHMAN

*Attesting Officer*  Commissioner of Patents and Trademarks